United States Patent
Kato et al.

(10) Patent No.: US 9,601,780 B2
(45) Date of Patent: Mar. 21, 2017

(54) MULTILAYER CONDUCTIVE FILM, CURRENT COLLECTOR USING SAME, BATTERY AND BIPOLAR BATTERY

(75) Inventors: Yusuke Kato, Settsu (JP); Masahiro Kojima, Settsu (JP); Ryutaro Mukai, Settsu (JP); Masato Kusakabe, Settsu (JP); Hiroyuki Ogino, Settsu (JP); Takashi Kikuchi, Settsu (JP); Takashi Ito, Settsu (JP); Satoshi Oku, Settsu (JP); Akiko Waki, Settsu (JP); Shiho Inoue, Yokohama (JP); Yuji Muroya, Yokohama (JP); Norihisa Waki, Yokohama (JP); Yasuyuki Tanaka, Yokohama (JP); Shigeo Ibuka, Yokohama (JP); Yoshio Shimoida, Yokohama (JP)

(73) Assignees: KANEKA CORPORATION, Osaka (JP); NISSAN MOTOR CO., LTD., Kanagawa (JP)

( * ) Notice: Subject to any disclaimer, the term of this patent is extended or adjusted under 35 U.S.C. 154(b) by 342 days.

(21) Appl. No.: 14/119,290

(22) PCT Filed: May 22, 2012

(86) PCT No.: PCT/JP2012/063020
§ 371 (c)(1),
(2), (4) Date: Nov. 21, 2013

(87) PCT Pub. No.: WO2012/161180
PCT Pub. Date: Nov. 29, 2012

(65) Prior Publication Data
US 2014/0186699 A1 Jul. 3, 2014

(30) Foreign Application Priority Data
May 23, 2011 (JP) .................................. 2011-114969

(51) Int. Cl.
*H01M 4/66* (2006.01)
*H01M 10/0525* (2010.01)
(Continued)

(52) U.S. Cl.
CPC ............. *H01M 4/668* (2013.01); *B32B 27/08* (2013.01); *B32B 27/20* (2013.01); *B32B 27/281* (2013.01);
(Continued)

(58) Field of Classification Search
CPC ........ H01M 4/667; H01M 4/64; H01M 4/661; H01M 4/668
(Continued)

(56) References Cited

U.S. PATENT DOCUMENTS

2009/0191461 A1* 7/2009 Nakamura .............. H01M 4/13
429/209
2013/0330590 A1* 12/2013 Toyoda ............... H01M 2/1653
429/142

FOREIGN PATENT DOCUMENTS

JP 2004-095400 A 3/2004
JP 2006-190649 A 7/2006
(Continued)

OTHER PUBLICATIONS

Machine translation JP 2011-8981.*

*Primary Examiner* — Stewart Fraser
*Assistant Examiner* — Rachel L Zhang
(74) *Attorney, Agent, or Firm* — Polsinelli PC

(57) ABSTRACT

A multilayer conductive film includes a layer 1 including a conductive material containing a polymer material 1 having an alicyclic structure and conductive particles 1 and a layer 2 including a material having durability against positive electrode potential. The multilayer conductive film has stability in an equilibrium potential environment in a negative
(Continued)

electrode and stability in an equilibrium potential environment in a positive electrode, has low electric resistance per unit area in the thickness direction, and has excellent barrier properties for a solvent of an electrolytic solution. A battery including a current collector employing the multilayer conductive film can achieve both weight reduction and durability.

21 Claims, 1 Drawing Sheet

(51) Int. Cl.
    *C08K 3/04*     (2006.01)
    *C08J 7/04*     (2006.01)
    *B32B 27/08*     (2006.01)
    *B32B 27/20*     (2006.01)
    *B32B 27/28*     (2006.01)
    *B32B 27/32*     (2006.01)
    *H01M 4/02*     (2006.01)

(52) U.S. Cl.
CPC .............. *B32B 27/325* (2013.01); *C08J 7/047* (2013.01); *C08K 3/04* (2013.01); *H01M 4/661* (2013.01); *H01M 4/663* (2013.01); *H01M 4/666* (2013.01); *H01M 4/667* (2013.01); *H01M 10/0525* (2013.01); *B32B 2264/10* (2013.01); *B32B 2264/105* (2013.01); *B32B 2307/202* (2013.01); *B32B 2307/206* (2013.01); *B32B 2457/10* (2013.01); *C08G 2261/3324* (2013.01); *C08G 2261/418* (2013.01); *C08J 2379/08* (2013.01); *C08J 2465/00* (2013.01); *C08K 2201/001* (2013.01); *H01M 2004/029* (2013.01); *Y02E 60/122* (2013.01)

(58) Field of Classification Search
USPC ................................................ 429/210, 211
See application file for complete search history.

(56) References Cited

FOREIGN PATENT DOCUMENTS

| | | |
|---|---|---|
| JP | 2010-251197 A | 11/2010 |
| JP | 2011-008981 A | 1/2011 |
| JP | 2011-054492 A | 3/2011 |
| WO | WO-99/02585 A1 | 1/1999 |
| WO | WO 2012115252 * | 8/2012 |

* cited by examiner

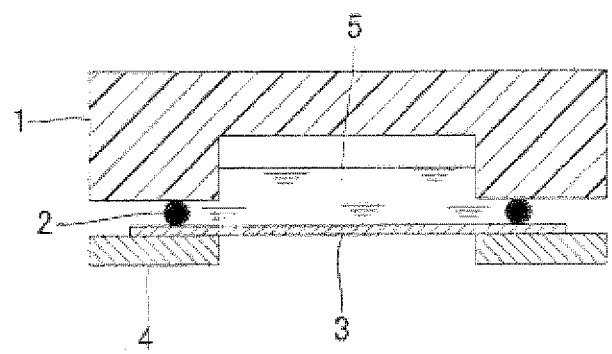

MULTILAYER CONDUCTIVE FILM, CURRENT COLLECTOR USING SAME, BATTERY AND BIPOLAR BATTERY

CROSS REFERENCE TO RELATED APPLICATIONS

This application is a National Phase filing under 35 U.S.C. §371 of PCT/JP2012/063020 filed on May 22, 2012; and this application claims priority to Application No. 2011-114969 filed in Japan on May 23, 2011 under 35 U.S.C. §119; the entire contents of all are hereby incorporated by reference.

TECHNICAL FIELD

The present invention relates to a multilayer conductive film, a current collector using the film, a battery, and a bipolar battery.

BACKGROUND ART

For environmental protection, there has been a demand for compact batteries with high output density as the power source for vehicles and cellular phones. Specifically, a lithium ion battery, which includes an active material having high output density, has been drawing attention.

The application to the power source for vehicles requires a plurality of lithium ion batteries that are connected in series to increase the output power. However, batteries connected through connection members have a problem of power reduction due to electric resistance of the connection members. In addition, the connection member has disadvantageous effects on the space and weight of batteries.

In order to solve the problems, a bipolar battery has been developed. The bipolar battery includes a current collector having both faces on which a positive electrode active material and a negative electrode active material are provided.

The current collector that is one of the members of a bipolar battery and is in contact with a negative electrode is required to have stability in an equilibrium potential environment between the negative electrode active material and a lithium ion and electric conductivity. In addition, the current collector is required to pass no component contained in an electrolytic solution because the leakage of components in an electrolytic solution out of a system degrades the performance of a battery.

Patent Document 1 discloses using metal foil as a current collector and Patent Documents 2 and 3 disclose that a current collector containing a polymer material achieves weight reduction of the current collector and this improves the output density per weight of a battery.

However, in consideration of the structure of a bipolar battery, the positive electrode active material layer-forming face of the current collector is required to be stable in the equilibrium potential environment between the positive electrode active material and a lithium ion, and the opposite side, that is, the negative electrode active material layer-forming face of the current collector is required to be stable in the equilibrium potential environment between the negative electrode active material and a lithium ion.

In the case of a current collector using metal foil as disclosed in Patent Document 1, a current collector selecting a metal foil such as a SUS foil is stable in the equilibrium potential environments in both a positive electrode and a negative electrode, but a battery including such a collector is heavier than a battery including a current collector containing a polymer material as disclosed in Patent Documents 2 and 3, and this limits the improvement in output density.

In contrast, the current collectors disclosed in Patent Documents 2 and 3 reduce the weight of a battery and this should improve the output density. However, the current collector has insufficient stability in the equilibrium potential environments in both the positive electrode and the negative electrode and this specifically shortens battery life and is required to be improved. In addition, a current collector using a polymer material such as polyethylene and polypropylene passes a solvent of an electrolytic solution. On this account, a charged battery, in which a solvated lithium ion moves through the current collector, has a problem of failing to maintain the state of charge for a long period of time.

Patent Document 4 has studied a conductive resin film containing a cyclic olefinic resin and a conductive filler as a current collector of an electric double layer capacitor. However, the study whether the conductive resin film can be used as a current collector for a bipolar battery or not has revealed that the film has insufficient stability in the equilibrium potential environment in the positive electrode.

CITATION LIST

Patent Literature

Patent Document 1: JP-A No. 2004-95400
Patent Document 2: JP-A No. 2006-190649
Patent Document 3: JP-A No. 2010-251197
Patent Document 4: WO 99/2585

SUMMARY OF INVENTION

Technical Problem

An object of the present invention is to provide a multilayer conductive film that has stability in an equilibrium potential environment in a negative electrode and stability in an equilibrium potential environment in a positive electrode, has low electric resistance per unit area in the thickness direction (low electric resistance), and has excellent barrier properties for a solvent of an electrolytic solution.

Another object of the present invent on is to provide a multilayer conductive film that has stability in an equilibrium potential environment in a negative electrode, low electric resistance, barrier properties for a solvent of an electrolytic solution, stability in an equilibrium potential environment in a positive electrode, and excellent barrier properties for a component (ion) contained in an electrolytic solution.

Another object of the present invention is to provide a multilayer conductive film that has stability in an equilibrium potential environment in a negative electrode, low electric resistance, barrier properties for a solvent of an electrolytic solution, stability in an equilibrium potential environment in a positive electrode, and excellent interlayer adhesion.

Solution to Problem

Intensive studies by the inventors of the present invention on a current collector using a polymer material have revealed that an electrolytic solution and a certain polymer material undergo electrochemical reaction in an equilibrium potential environment in a negative electrode. A current collector using a conductive film in which a conductive filler is mixed with a polymer material such as polyethylene and polypropylene, which fails to undergo electrochemical reaction with an electrolytic solution in an equilibrium potential environment in a negative electrode, passes a solvent of the electrolytic solution, and this causes a problem of failing to maintain the state of charge for a long period of time due to the dried up solvent of the electrolytic solution in a battery or of failing to achieve intended performance of a battery. As a result of repeated studies in view of these problems, the inventors have found that a polymer material having an alicyclic structure is unlikely to undergo electrochemical reaction with an electrolytic solution in an equilibrium potential environment in a negative electrode and also has barrier properties for a solvent of an electrolytic solution. As a result of further intensive studies, the inventors have found that a multilayer conductive film including a layer 1 that includes a conductive material containing a polymer material 1 having an alicyclic structure and conductive particles 1 and a layer 2 that includes a material having durability against positive electrode potential can solve the problems and have completed the invention.

That is, the present invention relates to a multilayer conductive film that includes a layer 1 including a conductive material containing a polymer material 1 having an alicyclic structure and conductive particles 1 and a layer 2 including a material having durability against positive electrode potential.

In the multilayer conductive film of the present invention, it is preferable that the polymer material 1 having an alicyclic structure have a structural unit derived from cycloolefin on a main chain.

In the multilayer conductive film of the present invention, it is preferable that the polymer material 1 having an alicyclic structure have an alicyclic structure with a condensed ring structure.

In the multilayer conductive film of the present invention, it is preferable that the polymer material 1 having an alicyclic structure be a norbornene polymer and/or a hydrogenated product of the norbornene polymer.

In the multilayer conductive film of the present invention, it is preferable that the polymer material 1 having an alicyclic structure be at least one selected from the group consisting of a ring-opened polymer of a norbornene monomer, a hydrogenated product of a ring-opened polymer of a norbornene monomer, an addition polymer of a norbornene monomer, and an addition copolymer of a norbornene monomer and a vinyl monomer.

In the multilayer conductive film of the present invention, it is preferable that the conductive particles 1 be carbon conductive particles or conductive particles containing a metallic element, and it is more preferable that the conductive particles 1 be conductive particles containing a metallic element.

It is preferable that the metallic element be at least one selected from the group consisting of platinum, gold, silver, copper, nickel, and titanium.

In the multilayer conductive film of the present invention, it is preferable that the conductive material contain the conductive particles 1 and the polymer material 1 having an alicyclic structure in a weight ratio ranging from 1:99 to 99:1.

In the multilayer conductive film of the present invention, it is preferable that the conductive material contain insulating plate-like inorganic particles.

It is preferable that the insulating plate-like inorganic particles have a plate-like shape having an aspect ratio of 5 or more.

It is preferable that the insulating plate-like inorganic particles be contained in an amount of 1 to 200 parts by weight with respect to 100 parts by weight of the polymer material 1 having an alicyclic structure.

In the multilayer conductive film of the present invention, it is preferable that the material having durability against positive electrode potential be a conductive material containing a polymer material 2 having durability against positive electrode potential and conductive particles 2.

It is preferable that the polymer material 2 be at least one selected from the group consisting of aromatic polyimide, polyamide-imide, and polyamide.

It is preferable that the conductive particles 2 be carbon conductive particles.

In the multilayer conductive film of the present invention, it is preferable that the material having durability against positive electrode potential contain the polymer material 2 and the conductive particles 2 in a weight ratio ranging from 50:50 to 99:1.

It is preferable that the multilayer conductive film of the present invention have a thickness of 1 to 100 μm.

It is preferable that the multilayer conductive film of the present invention have an electric resistance per unit area in the thickness direction of $10\Omega \cdot cm^2$ or less.

A current collector of the present invention includes the multilayer conductive film of the present invention.

A battery of the present invention includes the current collector of the present invention.

It is preferable that the battery of the present invention be a bipolar battery.

It is preferable that the bipolar battery of the present invention include the multilayer conductive film of the present invention, a layer of a negative electrode active material, the layer being electrically connected to one face of the multilayer conductive film, a layer of a positive electrode active material, the layer being electrically connected to the other face of the multilayer conductive film, and electrolyte layers alternately stacked on electrodes for the bipolar battery, the electrode including the multilayer conductive film, the positive electrode active material layer, and the negative electrode active material layer, and the positive electrode active material layer being in contact with the layer 2 of the multilayer conductive film.

In the bipolar battery of the present invention, it is preferable that the positive electrode active material contain a composite oxide of lithium and a transition metal and the negative electrode active material contain a composite oxide of lithium and a transition metal and/or carbon.

Advantageous Effects of Invention

A multilayer conductive film of the present invention has stability in an equilibrium potential environment in a negative electrode and stability in an equilibrium potential environment in a positive electrode, has low electric resistance per unit area in the thickness direction, and has excellent barrier properties for a solvent of an electrolytic solution.

Using the multilayer conductive film of the present invention as a current collector enables the production of a battery satisfying both weight reduction and durability.

The multilayer conductive film of the present invention in which the conductive particles 1 are conductive particles containing a metallic element has excellent barrier properties for a component contained in an electrolytic solution in addition to the advantageous effects above.

The multilayer conductive film of the present invention in which the conductive material contains insulating plate-like inorganic particles has excellent interlayer adhesion in addition to the advantageous effects above.

BRIEF DESCRIPTION OF DRAWING

FIG. 1 is a schematic view for the measurement of barrier properties for a solvent of an electrolytic solution in an example of the present invention.

DESCRIPTION OF EMBODIMENTS

An embodiment of the present invention will be described as below, but the present invention is not limited to the embodiment.

A multilayer conductive film of the present invention is characterized by including a layer 1 that includes a conductive material (hereinafter also called "conductive material 1") containing a polymer material 1 having an alicyclic structure and conductive particles 1 and a layer 2 that includes a material having durability against positive electrode potential.

The conductive material 1 included in the layer 1 in the multilayer conductive film of the present invention contains the polymer material 1 having an alicyclic structure and the conductive particles 1 and thus produces advantageous effects of having durability against negative electrode potential and having excellent barrier properties for a solvent of an electrolytic solution.

In the present invention, having durability against negative electrode potential (stability in an equilibrium potential environment in a negative electrode) means having durability against the equilibrium potential environment to a lithium ion in a negative electrode active material. It specifically means that no material undergoes, for example, degradation in an environment of +0 V to +2 V with respect to the equilibrium potential between metallic lithium and a lithium ion.

The durability against negative electrode potential can be determined by electrochemical technique. Specifically, an electrochemical cell equipped with a counter electrode of lithium metal and a work electrode of the multilayer conductive film of the present invention is used, and a constant current is supplied from the work electrode to the counter electrode. When the potential difference between the work electrode and the counter electrode reaches an intended potential difference between +0 V and +2 V within a predetermined period of time, such a multilayer conductive film can be judged to have excellent durability. When the potential difference fails to reach an intended value, such a multilayer conductive film can be judged to have no durability because materials undergo, for example, degradation. A multilayer conductive film having no durability against negative electrode potential is not preferred because such a film employed, in a battery deteriorates by charging and this shortens the battery life.

In the present invention, having excellent barrier properties for a solvent of an electrolytic solution means that being unlikely to pass a solvent used in a lithium ion battery. The barrier properties for a solvent of an electrolytic solution is not particularly limited but, for example, it can be evaluated by bringing a solvent (for example, a carbonate solvent) of an electrolytic solution used in a lithium ion battery into contact with one face of a single layer film of the layer 1 while the other face is in contact with dry air and determining the permeation amount of the solvent of an electrolytic solution within a predetermined period of time. Specifically, a film having an area in contact with a carbonate solvent of 16.6 $cm^2$ preferably has a solvent permeation amount of 100 mg or less at 25° C. after two weeks, more preferably 50 mg or less, and even more preferably 5 mg or less. A bipolar battery employing the multilayer conductive film having excellent barrier properties for a solvent of an electrolytic solution can suppress a side reaction caused by the transfer of a solvated ion through the layer 1 to layers other than the layer 1 and can reduce the electric loss by charging and discharging.

The polymer material 1 having an alicyclic structure used in the layer 1 of the present invention will be described.

The alicyclic structure can be classified into a monocyclic structure and a condensed ring structure. The condensed ring structure has two or more ring structures that share two or more atoms. The condensed ring structure is preferred from the viewpoint of mechanical strength and barrier properties for a solvent of an electrolytic solution.

The alicyclic structure can be classified into a saturated cyclic hydrocarbon (cycloalkane) structure, an unsaturated cyclic hydrocarbon (cycloalkene, cycloalkane) structure, and other structures, in terms of binding patterns between carbon atoms. A cycloalkane structure and a cycloalkene structure are preferred, and specifically, a cycloalkane structure is more preferred, from the viewpoint of mechanical strength, heat resistance, and other properties.

The number of carbon atoms included in the alicyclic structure is not particularly limited, but preferably ranges from 4 to 30, more preferably 5 to 20, and even more preferably 5 to 15. An alicyclic structure having carbon atoms within the range achieves good balance of mechanical strength, heat resistance, and film formability.

The alicyclic structure may be on a main chain or on a side chain, but the alicyclic structure is preferably on a main chain from the viewpoint of mechanical strength, heat resistance, and other properties, and a structural unit derived from a cycloolefin is more preferably on a main chain.

The polymer material 1 having an alicyclic structure preferably contains a repeating unit including the alicyclic structure (a structural unit derived from a monomer having the alicyclic structure) in a ratio of 50% by weight or more and more preferably 70% by weight or more. A polymer material having an alicyclic structure preferably contains the repeating unit including the alicyclic structure in a ratio within the range from the viewpoint of barrier properties for a solvent of an electrolytic solution and heat resistance. In the polymer material having an alicyclic structure, the residual structure except the repeating unit having the alicyclic structure is not particularly limited but is preferably a saturated hydrocarbon structure from the viewpoint of durability against negative electrode potential and heat resistance.

Specific examples of the polymer material 1 having an alicyclic structure include (1) norbornene polymers, (2) monocyclic olefin polymers, (3) cyclic conjugated diene polymers, (4) vinyl alicyclic hydrocarbon polymers, and hydrogenated products of the polymers in (1) to (4).

(1) Norbornene Polymer

Examples of the norbornene polymer include a ring-opened polymer of a norbornene monomer, a ring-opened copolymer of a norbornene monomer and an additional monomer that is ring-opening copolymerizable with the norbornene monomer, a hydrogenated product of a ring-opened polymer of a norbornene monomer, a hydrogenated product of a ring-opened copolymer of a norbornene monomer and an additional monomer that is ring-opening copolymerizable with the norbornene monomer, an addition polymer of a norbornene monomer, and an addition copolymer of a norbornene monomer and an additional monomer that is copolymerizable with the norbornene monomer.

The hydrogenated product of a ring-opened polymer of a norbornene monomer and the hydrogenated product of a ring-opened copolymer of a norbornene monomer and an additional monomer that is ring-opening copolymerizable with the norbornene monomer preferably have a hydrogenation ratio of 99% or more because such a hydrogenated product achieves excellent long-term stability and durability against negative electrode potential.

Examples of the norbornene monomer include alicyclic compounds such as bicyclo[2.2.1]hept-2-ene (common name: norbornene), tricyclo[4.3.01,6.12,5]deca-3,7-diene (common name: dicyclopentadiene), 7,8-benzotricyclo[4.3.0.12,5]dec-3-ene (common name: methanotetrahydrofluorene; also called 1,4-methano-1,4,4a,9a-tetrahydrofluorene), and tetracyclo[4,4,0,12,5,17,10]dodec-3-ene (common name: tetracyclododecene) and these alicyclic compounds having a substituent (such as an alkyl group, an alkylene group, an alkylidene group, and an alkoxycarbonyl group). These norbornene monomers are used singly or in combination of two or more of them.

The ring-opened polymer of a norbornene monomer or the ring-opened copolymer of a norbornene monomer and an additional monomer that is ring-opening copolymerizable with the norbornene monomer can be obtained by polymerization of a monomer component in the presence of a ring-opening polymerization catalyst. Usable examples of the ring-opening polymerization catalyst include a catalyst including a halide of a metal such as ruthenium, rhodium, palladium, osmium, iridium, and platinum, a nitrate or an acetylacetone compound, and a reducing agent or a catalyst including a halide or an acetylacetone compound of a metal such as titanium, vanadium, zirconium, tungsten, and molybdenum and an organic aluminum compound. The polymerization reaction is performed in a solvent or without solvent typically at a polymerization temperature of −50° C. to 100° C. and at a polymerization pressure of 0 to 5 MPa. Examples of the additional monomer that is ring-opening copolymerizable with a norbornene monomer include, but are not limited to, monocyclic olefin monomers such as cyclohexene, cycloheptene, and cyclooctene.

The hydrogenated product of a ring-opened polymer of a norbornene monomer can be typically obtained by adding a hydrogenation catalyst to a polymerization solution of the ring-opened polymer to hydrogenate a carbon-carbon unsaturated bond. Typical examples of the hydrogenation catalyst to be used include, but are not necessarily limited to, a heterogeneous catalyst and a homogeneous catalyst.

The addition (co)polymer of a norbornene monomer or a norbornene monomer and an additional monomer copolymerizable with the norbornene monomer can be obtained by (co)polymerizing a monomer component in a solvent or without solvent in the presence of a catalyst including a titanium, zirconium, or vanadium compound and an organic aluminum compound typically at a polymerization temperature of −50° C. to 100° C. and at a polymerization pressure of 0 to 5 MPa, for example.

Examples of the additional monomer copolymerizable with the norbornene monomer include, but are not limited to, vinyl monomers having 2 to 20 carbon atoms, such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene; cycloolefins such as cyclobutene, cyclopentene, cyclohexene, 3,4-dimethylcyclopentene, 3-methylcyclohexene, 2-(2-methylbutyl)-1-cyclohexene, cyclooctene, and 3a,5,6,7a-tetrahydro-4,7-methano-1H-indene; and non-conjugated dienes such as 1,4-hexadiene, 4-methyl-1,4-hexadiene, 5-methyl-1,4-hexadiene, and 1,7-octadiene. Among them, vinyl monomers, specifically, ethylene is preferred from the viewpoint of heat resistance and other properties.

These additional monomers copolymerizable with the norbornene monomer may be used singly or in combination of two or more of them. For addition copolymerization of a norbornene monomer and an additional monomer copolymerizable with the norbornene monomer, the addition copolymer is appropriately designed so that the weight ratio of the structural unit derived from the norbornene monomer and the structural unit derived from the additional copolymerizable monomer typically ranges from 30:70 to 99:1, preferably 50:50 to 97:3, and more preferably 70:30 to 95:5. The addition copolymer having a ratio within the range achieves excellent barrier properties for a solvent of an electrolytic solution and mechanical strength.

Examples of the norbornene polymer obtained by ring-opening polymerization include hydrogenated products of ring-opened polymers of norbornene monomers, such as ZEONEX (registered trademark; manufactured by ZEON Corporation), ZEONOR (registered trademark; manufactured, by ZEON Corporation), and ARTON (registered trademark; manufactured by JSR Corporation). Examples of the addition polymer include addition copolymers of a norbornene monomer and ethylene, such as APEL (registered trademark; manufactured by Mitsui Chemicals, Inc.) and TOPAS (registered trademark; manufactured by Polyplastics Co., Ltd.).

(2) Monocyclic Olefin Polymer

Examples of the monocyclic olefin polymer include addition polymers of monocyclic olefin monomers such as cyclohexene, cycloheptene, and cyclooctene.

(3) Cyclic Conjugated Diene Polymer

Examples of the cyclic conjugated diene polymer include polymers obtained by 1,2- or 1,4-addition polymerization of a cyclic conjugated diene monomer such as cyclopentadiene and cyclohexadiene and hydrogenated products of the polymers.

(4) Vinyl Alicyclic Hydrocarbon Polymer

Examples of the vinyl alicyclic hydrocarbon polymer include polymers of vinyl alicyclic hydrocarbon monomers such as vinylcyclohexene and vinylcyclohexane and hydrogenated products of the polymers; and, aromatic ring-hydrogenated products of polymers of vinyl aromatic monomers such as styrene and α-methylstyrene. The vinyl alicyclic hydrocarbon polymer may be any of a vinyl alicyclic hydrocarbon polymer, copolymers such as a random copolymer and, a block copolymer of a vinyl aromatic monomer and an additional monomer copolymerizable with such a monomer, and a hydrogenated product thereof. Examples of the block copolymer include, but are not limited to, a diblock copolymer, a triblock copolymer, a multiblock copolymer, and an inclined block copolymer.

From the viewpoint of barrier properties for an electrolytic solution, the polymer material 1 to be used is preferably a norbornene polymer and/or a hydrogenated product of the norbornene polymer and more preferably at least one selected from the group consisting of a ring-opened polymer of a norbornene monomer, a hydrogenated product of a ring-opened polymer of a norbornene monomer, an addition polymer of a norbornene monomer, and an addition copolymer of a norbornene monomer and a vinyl monomer. From the viewpoint of durability against negative electrode potential, long-term stability, and other properties, ring-opened polymers of a norbornene monomer having no polar group (registered trademark: ZEONEX, ZEONOR, manufactured by ZEON Corporation) are specifically preferred.

The molecular weight of the polymer material 1 having an alicyclic structure can be appropriately selected. The polymer material 1 typically has a weight average molecular weight Mw ranging from 5,000 to 1,000,000, preferably 8,000 to 800,000, and more preferably 10,000 to 500,000, determined by gel permeation chromatography of a cyclohexane solution (a toluene solution when a polymer resin is not dissolved in cyclohexane) in terms of polyisoprene or polystyrene. The polymer material 1 having a molecular weight within the range achieves good balance of the mechanical strength of a molded article and moldability.

The conductive particles 1 used in the layer 1 of the present invention will be described.

In the present invention, the conductive particles mean particulate solids having electric conductivity.

The conductive particles 1 are preferably a material having durability against negative electrode potential applied and are suitably SUS particles, carbon conductive particles, silver particles, gold particles, copper particles, titanium particles, and alloy particles and the like.

The carbon conductive particles have a very wide potential window, are stable in a wide range with respect to both positive electrode potential and negative electrode potential, and are excellent in conductivity. The carbon conductive particles are very lightweight and thus minimize the increase in mass. In addition, the carbon conductive particles are frequently used as the conductive auxiliary agent of an electrode. This greatly reduces contact resistance even if the carbon conductive particles are in contact with the conductive auxiliary agent because of the same material. Specific examples of the carbon conductive particles include carbon blacks such as acetylene black and Ketjenblack, graphite, graphene, and, carbon nanotubes. Among them, #3950B (manufactured by Mitsubishi Chemical Corporation), Black Pearls 2000 (manufactured by Cabot Corporation), Printex XE2B (manufactured by Degussa), Ketjenblack EC-600JD (manufactured by Lion Corporation), ECP-600JD (manufactured by Lion Corporation), EC-300J (manufactured by Lion Corporation), and ECP (manufactured by Lion Corporation) are preferably used because such a material has particularly excellent conductivity.

For conductive particles 1 employing carbon conductive particles, the carbon conductive particles may be subjected to surface hydrophobic treatment. This can reduce conformability to an electrolyte and make a condition in which the electrolyte is unlikely to penetrate pores in a current collector.

For a current collector employing a polymer material that is in contact with a negative electrode, the polymer material is required to have stability in an equilibrium potential environment in a negative electrode and to have barrier properties for a solvent of an electrolytic solution in order to prevent an electrolytic solution component from leaking. However, based on the study by the inventors, it has been observed that a polymer material containing carbon as the conductive particles is likely to gradually degrade battery performance. As a result of further studies to address the problem, the inventors have found that lithium ions in an electrolytic solution pass through carbon particles and have found that using a polymer material satisfying both the stability in an equilibrium potential environment in a negative electrode and the barrier properties for a solvent of an electrolytic solution and improving the barrier properties for a component (ion) in an electrolytic solution can further improve battery performance. The inventors have repeatedly performed intensive studies based on the findings and have found that using a polymer material having excellent stability in an equilibrium potential environment in a negative electrode and barrier properties for a solvent of an electrolytic solution and using conductive particles containing a metallic element can improve battery performance.

In the present invention, excellent barrier properties for a component contained in an electrolytic solution means that a component contained in an electrolytic solution of a lithium ion battery is unlikely to pass. The evaluation method of the barrier properties for a component contained in an electrolytic solution is not particularly limited and the barrier properties can be evaluated by determining lithium element distribution in a cross section of a multilayer conductive film after exposure to a predetermined potential environment by electrochemical technique. Specifically, an electrochemical cell equipped with a counter electrode of lithium metal and a work electrode of the multilayer conductive film of the present invention is used. A current is controlled for a week so that the potential difference between the work electrode and the counter electrode maintains an intended potential difference between +0 V and +2 V, and then the distribution of a lithium element present in a cross section of the multilayer conductive film is determined. The penetration depth of a lithium element from the film surface is preferably 5 μm or less, more preferably 3 μm or less, and even more preferably 1 μm or less. A battery employing the multilayer conductive film having excellent barrier properties for a component contained in an electrolytic solution can suppress a side reaction caused by the transfer of a component contained in an electrolytic solution through the layer 1 to layers other than the layer 1 and overvoltage caused by the reduction of a component contained in an electrolytic solution, thereby suppressing the deterioration of the battery.

Thus, from the viewpoint of long-term stability of a battery employing a multilayer conductive film as a current collector for the battery, the conductive particles 1 are preferably conductive particles containing a metallic element and are preferably an elemental metal and an alloy, an oxide, a carbide, a nitride, a silicide, a boride, and a phosphide thereof. Among them, from the viewpoint of conductivity, an elemental metal is more preferred. The conductive particles containing a metallic element may be a composite material. A pure metallic element is preferred because it can reduce the contact resistance with an active material.

The metallic element is not particularly limited but is preferably a material having durability against negative electrode potential applied, such as platinum, gold, silver, copper, tin, bismuth, zinc, nickel, palladium, chromium, indium, antimony, aluminum, germanium, silicon, beryllium, tungsten, molybdenum, manganese, tantalum, titanium, neodymium, magnesium, and zirconium and more preferably platinum, gold, silver, copper, nickel, and titanium. Examples of the alloy of metallic elements include SUS, Nichrome, constantan, and nickel silver.

The conductive particles containing a metallic element may have any shape but the shape is preferably a dendritic shape, an acicular shape, a plate-like shape, a flaky shape, and a scaly shape, for example, because the multilayer conductive film obtains excellent conductivity.

The conductive particles containing a metallic element may have any particle size but the average particle size is preferably 0.05 to 100 μm, more preferably 0.1 to 75 μm, even more preferably 0.1 to 50 µm, and particularly preferably 0.5 to 25 µm. An average particle size of less than 0.05 µm is likely to increase electric resistance due to interface resistance of the conductive particles containing a metallic element, and an average particle size of more than 100 82 m may largely impair surface nature or largely reduce mechanical characteristics. The average particle size can be determined by laser diffraction particle size distribution.

In the present invention, the conductive particles 1 may also employ, for example, particles of a conductive polymer such as polypyrrole and polyaniline in addition to the particles above and may employ particles practically used as what is called a filler conductive resin composition.

The conductive particles 1 may be distributed homogeneously or inhomogeneously in the layer 1 in the multilayer conductive film and the distribution of the conductive particles 1 may fluctuate in the layer 1 in the multilayer conductive film. A plurality types of conductive particles may be used and the distribution of the conductive particles 1 may fluctuate in the layer 1 in the multilayer conductive film.

The weight blending ratio of the polymer material 1 having an alicyclic structure and the conductive particles 1 is preferably 1:99 to 99:1, more preferably 50:50 to 99:1, even more preferably 6040 to 98:2, and most preferably 70:30 to 95:5. A polymer material 1 having a blending ratio within the range improves the reduction in conductivity, is unlikely to impair the function as the multilayer conductive film, and makes handling easy.

The inventors have also found that the addition of insulating plate-like inorganic particles can improve the interlayer adhesion between the layer 1 containing the polymer material 1 having an alicyclic structure and the conductive particles 1 and another layer without impairing stability in an equilibrium potential environment in a negative electrode and solvent barrier properties. Thus, the layer 1 of the multilayer conductive film of the present invention more preferably contains insulating plate-like inorganic particles. A layer containing the insulating plate-like inorganic particles enables the production of a multilayer conductive film that has excellent interlayer adhesion and is unlikely to be removed during conveyance.

The interlayer adhesion in the multilayer conductive film of the present invention can be evaluated by cutting out the multilayer conductive film into a size of 2 cm×4 cm and determining, with a load cell, the force (adhesion force) generated when the layer 1 is peeled from another layer at a predetermined speed in a longitudinal direction while the layer 1 and the other layer is maintained in a T-shape. The adhesion force is preferably 0.3 N/20 mm or more and more preferably 0.5 N/20 mm or more. It is most preferable that the adhesion force is 0.7 N/20 mm or more and cohesion failure is caused in either layer after the test. A film having an adhesion force of less than 0.3 N/20 mm may undergo delamination during conveyance or handling.

The insulating plate-like inorganic particles in the layer 1 of the present invention can employ natural or synthetic known insulating plate-like inorganic particles. Unlike conductive plate-like inorganic particles, the insulating plate-like inorganic particles can appropriately control electric resistance in the in-plane direction. This prevents a battery including a current collector employing such a multilayer conductive film from breaking due to an overcurrent in the in-plane direction of the current collector when a short-circuit occurs. Examples of the insulating plate-like inorganic particles include scaly or flaky mica, mica, sericite, illite, talc, kaolinite, montmorillonite, smectite, vermiculite, plate-like or flaky titanium dioxide, potassium titanate, lithium titanate, boehmite, and alumina. Among them, plate-like or flaky talc, kaolinite, mica, titanium dioxide, and alumina are preferred and talc, kaolinite, and mica are most preferred. In the present invention, a plate-like shape includes, in addition to the plate-like shape, a flaky shape and a scaly shape, for example.

In the multilayer conductive film, if the layer 1 having a larger linear expansion coefficient than the linear expansion coefficient of the layer 2 contains the insulating plate-like inorganic particles, the insulating plate-like inorganic particles also provide an effect of reducing warpage of the multilayer conductive film. Such a case is exemplified by a layer 2 employing aromatic polyimide, polyamide-imide, aromatic polyamide, polyphenylene ether, or polyphenylene sulfide. Among them, a layer 2 employing aromatic polyimide is an effective case. The warpage degree of a multilayer conductive film can be evaluated as follows: a part of the film is cut into a 5-cm square; next, the cutout film is absolutely dried and is left on a horizontal plane in a low humidity environment with a dew point of −30° C. or less; and then, rising of the multilayer conductive film is measured. It is preferable that the multilayer conductive film is not wound once or more and has a rising distance of 1 cm or less. The rising distance is more preferably 7 mm or less and most preferably 5 mm or less. A multilayer conductive film spontaneously wound once or more or having a rising distance of 1 cm or more may have difficulty in handling.

An aspect ratio of the insulating plate-like inorganic particles in the present invention can be determined as follows: a fine powder of the insulating plate-like inorganic particles is observed under a scanning electron microscope (S-4800, manufactured by Hitachi, Ltd.) at a magnification of 30,000 to 100,000; ten particles having an observable cross section are arbitrarily selected; the thickness and the length of each cross section are measured; the ratio of length/thickness is calculated; and the arithmetic mean is calculated. The insulating plate-like inorganic particles in the present invention preferably have an aspect ratio of 5 or more and more preferably 7 or more. Insulating plate-like inorganic particles having an aspect ratio of 5 or more are likely to be oriented in the multilayer conductive film and are unlikely to increase the resistance value in the thickness direction. The insulating plate-like inorganic particles preferably have a major axis from 0.1 µm to about 100 and more preferably from 0.2 µm to 50 µm. Insulating plate-like inorganic particles having a major axis within the range allow the layer 1 to maintain the strength and make handling easy.

The insulating plate-like inorganic particles in the present invention may be subjected to surface treatment with a coupling agent, for example. The surface treatment with a coupling agent or other agents can improve mechanical strength of the multilayer conductive film and battery performance. The coupling agent is not particularly limited and usable coupling agents are typically used coupling agents such as a silane coupling agent, a titanate coupling agent, and an aluminate coupling agent. The surface treatment method capable of being employed is a known dry or wet surface treatment method.

Commercially available examples of the insulating plate-like inorganic particles include micas such as A series (manufactured by Yamaguchi Mica Co., Ltd.), B series (manufactured by Yamaguchi Mica Co., Ltd.), C series (manufactured by Yamaguchi Mica Co., Ltd.), SJ series (manufactured by Yamaguchi Mica Co., Ltd.), L-plier series (manufactured by Yamaguchi Mica Co., Ltd.), MICALET series (manufactured by Yamaguchi Mica Co., Ltd.), Y series (manufactured by Yamaguchi Mica Co., Ltd.), SA series (manufactured by Yamaguchi Mica Co., Ltd.), EX series (manufactured by Yamaguchi Mica Co., Ltd.), and CT series (manufactured by Yamaguchi Mica Co., Ltd.); kaolinites such as RC-1 (manufactured by Takehara Kagaku Kogyo Co., Ltd.), Glomax LL (manufactured by Takehara Kagaku Kogyo Co., Ltd.), Satintone W (manufactured by Takehara Kagaku Kogyo Co., Ltd.), Satintone No. 5 (manufactured by Takehara Kagaku Kogyo Co., Ltd.), and NN kaolin clay (manufactured by Takehara Kagaku Kogyo Co., Ltd.); and talcs such as MICRO ACE (manufactured by Nippon Talc Co., Ltd.), NANO ACE (manufactured by Nippon Talc Co., Ltd.), J/M series (manufactured by Fuji Talc Industrial Co., Ltd.), MIM series (manufactured by Fuji Talc Industrial Co., Ltd.), RIM series (manufactured by Fuji Talc Industrial Co., Ltd.), RCP series (manufactured by Fuji Talc Industrial Co., Ltd.), FT series (manufactured by Fuji Talc Industrial Co., Ltd.), MF series (manufactured by Fuji Talc Industrial Co., Ltd.), PS series (manufactured by Asada Milling Co., Ltd.), SW series (manufactured by Asada Milling Co., Ltd.), and JET series (manufactured by Asada Milling Co., Ltd.).

The insulating plate-like inorganic particles may be distributed homogeneously or inhomogeneously in the layer 1 and the distribution of the insulating plate-like inorganic particles may fluctuate in the layer 1.

For the blending ratio of the polymer material 1 containing an alicyclic structure and the insulating plate-like inorganic particles, the insulating plate-like inorganic particles are preferably contained in an amount ranging from 1 to 200 parts by weight, more preferably ranging from 10 to 150 parts by weight, and most preferably ranging from 15 to 100 parts by weight, with respect to 100 parts by weight of the polymer material 1 containing an alicyclic structure. The blending ratio within the range allows the layer 1 to maintain the strength and makes handling easy.

The conductive material 1 may contain additional polymers and various additives as necessary. An elastomer can be added in order to improve flexibility of the multilayer conductive film.

Examples of the elastomer include, but are not necessarily limited to, thermosetting elastomers such as natural rubber, styrene-butadiene rubber, butadiene rubber, isoprene rubber, acrylic nitrile butadiene rubber, chloroprene rubber, ethylene propylene rubber, ethylene propylene terpolymer, butyl rubber, acrylic rubber, chlorosulfonated polyethylene, urethane rubber, silicone rubber, and fluororubber; and thermoplastic elastomers such as styrene elastomer, olefin elastomer, ester elastomer, urethane elastomer, vinyl chloride elastomer, and aramid, elastomer.

The layer 2 will next be described.

The layer 2 is characterized by having durability against positive electrode potential. In the present invention, having durability against positive electrode potential (stability in an equilibrium potential environment in a positive electrode) means having durability against the equilibrium potential environment to a lithium ion in a positive electrode active material. It typically means that no material undergoes. for example, degradation in an environment of +4 V to +5 V with respect to an equilibrium potential between metallic lithium and a lithium ion. The durability against positive electrode potential can be determined by electrochemical technique. Specifically, an electrochemical cell equipped with a counter electrode of lithium metal and a work electrode of the multilayer conductive film of the present invention is used. In a condition in which the potential of the work electrode with respect to the counter electrode is controlled so as to give an intended potential difference between +4 V and +5 V, when the current from the counter electrode to the work electrode after 1 day is half or less the current after 1 minute, such a multilayer conductive film can be judged to have durability against positive electrode potential. The current from the counter electrode to the work electrode after 1 day is preferably ⅕ or less the current after 1 minute and more preferably ¹⁄₁₀ or less.

The layer 2 of the present invention may employ various materials as long as the material has durability against positive electrode potential and examples of the material include a metal, a metal oxide, an electrically conductive polymer, and a composite of a polymer material and conductive particles. In the present invention, the layer 2 more preferably contains a composite (hereinafter also called "conductive material 2") of a polymer material 2 and conductive particles 2 because a material having a small weight density is preferred in order to improve battery performance, specifically, to reduce the weight.

A multilayer conductive film including the layer 2 that employs a polymer material having solvent barrier properties and durability against positive electrode potential is specifically suitable for a current collector for a bipolar battery. In a current collector that is for a bipolar battery and uses the multilayer conductive film including the layer 2 employing the polymer material having barrier properties for a solvent of an electrolytic solution and durability against positive electrode potential, the excellent barrier properties for a solvent of an electrolytic solution can suppress a side reaction caused by the transfer of a solvated ion through the layer 2 to layers other than the layer 2 and thus can reduce the electric loss by charging and discharging.

The polymer material 2 is not particularly limited and various polymer materials can be used as long as the material exhibits durability against positive electrode potential. Preferred materials are aromatic polyimide, polyamide-imide, polyimide, polyethylene, polypropylene, silicone, polyphenylene ether, nylon, polybutylene terephthalate, polyphenylene sulfide, polyether ether ketone, and polyester because these materials have excellent durability against positive electrode potential as well as excellent resistance to a solvent such as an electrolyte solvent used in a bipolar lithium ion battery and a solvent used during the production of an electrode. Aromatic polyimide, polyamide-imide, polyamide, polyphenylene ether, nylon, polybutylene terephthalate, polyphenylene sulfide, polyether ether ketone, and polyester are preferred because of excellent barrier properties for an electrolytic solution. Among them, aromatic polyimide, polyamide-imide, and polyamide are more preferred and aromatic polyimide is particularly preferred in the present invention.

Polyamide and polyamide-imide are not particularly limited as long as a polymer is obtained by reaction of a diamine and at least one acid compound selected from a dicarboxylic acid, a reactive acid derivative of a dicarboxylic acid, a tricarboxylic acid, and a reactive acid derivative of a tricarboxylic acid, and a known polymer can be used.

Examples of the dicarboxylic acid or a reactive acid derivative thereof include aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, cyclohexanedicarboxylic acid, and dimer acid; aromatic dicarboxylic acids such as phthalic acid, isophthalic acid, terephthalic acid, naphthalenedicarboxylic acid, oxydibenzoic acid, 4,4'-diphenyl ether dicarboxylic acid, 4,4'- diphenylsulfone dicarboxylic acid, and 4,4'-diphenyldicarboxylic acid; and reactive acid derivatives of these dicarboxylic acids.

Examples of the tricarboxylic acid or a reactive acid derivative thereof include trimellitic acid, 3,3,4'-benzophenonetricarboxylic acid, 2,3,4'-diphenyltricarboxylic acid, 2,3,6-pyridinetricarboxylic acid, 3,4,4'-benzanilidetricarboxylic acid, 1,4,5-naphthalenetricarboxylic acid, 2'-methoxy-3,4,4'-diphenyl ether tricarboxylic acid, and 2'-chlorobenzanilide-3,4,4'-tricarboxylic acid.

Examples of the diamine include 4,4'-diaminodiphenylpropane, 4,4'-diaminodiphenylmethane, benzidine, 3,3'-dichlorobenzidine, 3,3'-dimethylbenzidine, 2,2'-dimethylbenzidine, 3,3'-dimethoxybenzidine, 2,2'-dimethoxybenzidine, 4,4'-diaminodiphenyl sulfide, 3,3'-diaminodiphenylsulfone, 4,4'-diaminodiphenylsulfone, 4,4'-oxydianiline, 3,3'-oxydianiline, 3,4'-oxydianiline, 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl N-methylamine, 4,4'-diaminodiphenyl N-phenylamine, 1,4-diaminobenzene (p-phenylenediamine), 1,3-diaminobenzene, 1,2-diaminobenzene, bis{4-(4-aminophenoxy)phenyl}sulfone, bis{4-(4-aminophenoxy)phenyl}propane, bis{4-(3-aminophenoxy)phenyl}sulfone, 4,4'-bis(4-aminophenoxy)biphenyl, 4,4'-bis(3-aminophenoxy)biphenyl, 1,3-bis(3-aminophenoxy)benzene, 1,3-bis(4-aminophenoxy)benzene, 3,3-r-diaminobenzophenone, 4,4'-diaminobenzophenone, and analogues of them.

The aromatic polyimide may have any molecular structure as long as an aromatic tetracarboxylic dianhydride and an aromatic diamine are used. The aromatic polyimide is produced by using a polyamic acid as a precursor. The polyamic acid can be produced by any known method and is typically produced by dissolving an aromatic tetracarboxylic dianhydride and an aromatic diamine in substantially equimolecular amounts in an organic solvent and stirring the solution in a controlled temperature condition until the polymerization of the acid dianhydride and the diamine is completed. Such a polyamic acid solution can be typically obtained at a concentration of 5 to 35% by weight and preferably 10 to 30% by weight. A polyamic acid solution having a concentration within the range obtains an appropriate molecular weight and solution viscosity.

The polymerization method may be any known method and a combination method thereof. In the polymerization of a polyamic acid, the polymerization method is characterized by the addition order of monomers and controlling the addition order of monomers can control various physical properties of a polyimide to be obtained. Thus, the present invention may employ any method for addling monomers for the polymerization of the polyamic acid. Typical examples of the polymerization method are as below.

1) A method in which an aromatic diamine is dissolved in an organic polar solvent and is reacted with a substantially equimolecular amount of aromatic tetracarboxylic dianhydride to be polymerized.

2) A method in which an aromatic tetracarboxylic dianhydride is reacted with an aromatic diamine compound in a smaller amount than that of the aromatic tetracarboxylic dianhydride in an organic polar solvent to yield a prepolymer having each end with an acid anhydride group; and subsequently, the aromatic diamine compound is used to be polymerized so that the aromatic tetracarboxylic dianhydride and the aromatic diamine compound are substantially equimolecular in the total process.

3) A method in which an aromatic tetracarboxylic dianhydride is reacted with an aromatic diamine compound in a larger amount than that of the aromatic tetracarboxylic dianhydride in an organic polar solvent to yield a prepolymer having each end with an amino group; and subsequently, the aromatic diamine compound is further added, and then the aromatic tetracarboxylic dianhydride is used to be polymerized so that the aromatic tetracarboxylic dianhydride and the aromatic diamine compound are substantially equimolecular in the total process.

4) A method in which an aromatic tetracarboxylic dianhydride is dissolved and/or dispersed in an organic polar solvent, then an aromatic diamine compound is used so as to be substantially equimolecular, and the mixture is polymerized.

5) A method in which a mixture of an aromatic tetracarboxylic dianhydride and an aromatic diamine in substantially equimolecular amounts is reacted in an organic polar solvent to be polymerized.

These methods may be employed singly or may be partially combined.

The present invention may employ a polyamic acid obtained by using any of the polymerization methods.

Here, the material used in a solution of the polyamic acid as the precursor of the polyimide usable in the present invention will be described.

The appropriate tetracarboxylic dianhydride usable in the present invention includes pyromellitic dianhydride, 2,3,6,7-naphthalenetetracarboxylic dianhydride, 3,3',4,4'-biphenyltetracarboxylic dianhydride, 2,3,3',4'-biphenyltetracarboxylic dianhydride, 1,2,5,6-naphthalenetetracarboxylic dianhydride, 2,2',3,3'-biphenyltetracarboxylic dianhydride, 3,3',4,4'-benzophenonetetracarboxylic dianhydride, 4,4'-oxyphthalic dianhydride, 2,2-bis(3,4-dicarboxyphenyl)propane dianhydride, 3,4,9,10-perylenetetracarboxylic dianhydride, bis(3,4-dicarboxyphenyl)propane dianhydride, 1,1-bis(2,3-dicarboxyphenynethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic dianhydride, bis(3,4-dicarboxyphenyl)sulfone dianhydride, p-phenylene bis(trimellitic monoester anhydride), ethylene bis(trimellitic monoester anhydride), bisphenol A bis(trimellitic monoester anhydride), and analogues of them. These compounds are preferably used singly or as a mixture at any arbitrary ratio.

Among these acid dianhydrides, pyromellitic dianhydride, 3,3',4,4'-benzophenonetetracarboxylic dianhydride, 4,4'-oxyphthalic dianhydride, and 3,3',44-biphenyltetracarboxylic dianhydride are specifically preferred because such a compound is industrially easily available. These may be used singly or may be used as an appropriate mixture of two or more of them.

Examples of the appropriate diamine usable in the polyamic acid composition include 4,4'-diaminodiphenylpropane, 4,4'-diaminodiphenylmethane, benzidine, 3,3'-dichlorobenzidine, 3,3'-dimethylbenzidine, 2,2'-dimethylbenzidine, 3,3'-dimethoxybenzidine, 2,2'-dimethoxybenzidine, 4,4'-diaminodiphenyl sulfide, 3,3'-diaminodiphenylsulfone, 4,4'-diaminodiphenylsulfone, 4,4'-oxydianiline, 3,3'-oxydianiline, 3,4'-oxydianiline, 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl N-methylamine, 4,4'-diaminodiphenyl N-phenylamine, 1,4-diaminobenzene(p-phenylenediamine), 1,8-diaminobenzene, 1,2-diaminobenzene, bis{4-(4-aminophenoxy)phenyl}sulfone, bis{4-(4-aminophenoxy)phenyl}propane, bis{4-(3-aminophenoxy)phenyl}sulfone, 4,4'-bis(4-a ninophenoxy)biphenyl, 4,4'-bis(3-aminophenoxy)biphenyl, 1,3- bis(3-aminophenoxy)benzene, 1,3-bis(4-aminophenoxy) benzene, 3,3'-diaminobenzophenone, 4,4-diaminobenzophenone, and analogues of them.

Among these diamines, at least one selected from 4'-diaminodiphenylpropane, 4,4'-diaminodiphenylmethane, 4,4'-diaminodiphenylsulfone, 3,3'-oxydianiline, 3,4'-oxydianiline, 1,5-diaminonaphthalene, 4,4'-diaminodiphenylsilane, 4,4'-diaminodiphenylethylphosphine oxide, 4,4' diaminodiphenyl N-methylamine, 4,4-diaminodiphenyl N-phenylamine, 1,4-diaminobenzene (p-phenylenediamine), 1,3-diaminobenzene, 1,2-diaminobenzene, bis{4-(4-aminophenoxy) phenyl}sulfone, bis{4-(4-aminophenoxy)phenyl}propane, bis{4-(3-aminophenoxy)phenyl}sulfone, 4,4'-bis(4-aminophenoxy)biphenyl, 4,4'-bis(3-aminophenoxy)biphenyl, 1,3-bis(3-aminophenoxy)benzene, 1,3-bis(4-aminophenoxy) benzene, 3,3'-diaminobenzophenone, and 4,4'-diaminobenzophenone is specifically preferably used because these compounds are industrially easily available. These compounds may be used as an appropriate combination.

The solvent preferably used for the synthesis of a polyamic acid may be any solvent capable of dissolving the polyamic acid and is an amide solvent such as N,N-dimethylformamide, N,N-dimethylacetamide, and N-methyl-2-pyrrolidone. N,N-dimethylformamide and N,N-dimethylacetamide are particularly preferably used.

The conductive particles 2 used in the layer 2 of the present invention will next be described. The conductive particles 2 are preferably a material having durability against positive electrode potential applied. Preferred examples of such a material include, but are not necessarily limited to, aluminum, particles, SUS particles, carbon conductive particles, silver particles, gold particles, copper particles, titanium particles, and alloy particles. Among them, aluminum particles, SUS particles, and carbon conductive particles are more preferred and carbon conductive particles are particularly preferred because such a material is stable in a positive electrode potential environment. Specific examples of the carbon conductive particles include carbon blacks such as acetylene black and Ketjenblack, graphite, graphene, and carbon nanotubes.

The conductive particles 2 may employ a material practically used as what is called a filler conductive resin composition. Among them, #3950B (manufactured by Mitsubishi Chemical Corporation), Black Pearls 2000 (manufactured by Cabot Corporation), Printex XE2B (manufactured by Degussa), Ketjenblack EC-600JD (manufactured by Lion Corporation), ECP-600JD (manufactured by Lion Corporation), EC-300J (manufactured by Lion Corporation), and ECP (manufactured by Lion Corporation) are preferably used because such a material has particularly excellent conductivity.

The conductive particles 2 may be distributed homogeneously or inhomogeneously in the layer 2 and the distribution of the particles may fluctuate in the layer 2. A plurality types of conductive particles may be used and the distribution of the conductive particles 2 may fluctuate in the layer 2.

The weight blending ratio of the polymer material 2 and the conductive particles 2 is preferably 50:50 to 99:1 and more preferably 60:40 to 95:5. A polymer material 2 having a blending ratio within the range maintains the conductivity, does not impair the function as the multilayer conductive film, and has the strength as the multilayer conductive film to make handling easy.

The conductive materials used in the layer 1 and the layer 2 of the present invention can be produced by a known method applicable in industrial fields from a combination of a polymer material component and conductive particles. Non-limiting examples of the method are as follows:

(i) a method of combining and dispersing conductive particles while melting a polymer material component;
(ii) a method of combining and dispersing conductive particles while dissolving a polymer material component in a solvent;
(iii) a method of combining and dispersing conductive particles concurrently with polymerization reaction of a polymer material component; and
(iv) a method of combining and dispersing a precursor of a polymer material component and conductive particles.

A preferred method for forming the layer 1 is combining and dispersing conductive particles while inciting a polymer material component or while dissolving a polymer material component in a solvent in order to stably produce the multilayer conductive film. The solvent for dispersing the conductive particles is not particularly limited as long as the polymer material 1 having an alicyclic structure is dissolved or dispersed. Examples of the solvent include cyclohexane, methylcyclohexane, ethylcyclohexane, cyclohexanone, ethyl ether, THF, xylene, pentane, hexane, octane, and toluene. For the formation of the layer 2 employing a soluble polyimide as the polymer material 2, a polyimide solution and conductive particles can be combined and dispersed. In order to finely disperse conductive particles and to stabilize the dispersion state, a dispersant, a thickener, or other agents may be used within the range not affecting the film properties. The polymer material 2 including aromatic polyimide may employ a polyamic acid as a dispersant.

The combination and dispersion are preferably performed by using, for example, a ball mill, a bead mill, a sand mill, a colloid mill, a jet mill, or a roller mill, and the product preferably has a median diameter of 10 mm or less.

In particular, a conductive material employing carbon conductive particles is preferably dispersed by a method with a bead mill, a ball mill, or other means so as to yield a flowable liquid for good handling of the conductive material or a solution of the conductive material in the following film formation process.

In the multilayer conductive film of the present invention, the layer 1 and/or the layer 2 may contain a filler in order to improve various film properties such as sliding properties, heat conductivity, electric conductivity, corona resistance, loop stiffness, and curling properties. Any filler can be used.

The particle size of a filler is not particularly limited because it is determined depending on the film characteristics to be modified and the type of a filler to be added. The average particle size is typically 0.05 to 100 μm, preferably 0.1 to 75 μm, even more preferably 0.1 to 50 μm, and particularly preferably 0.1 to 25 μm. A filler having an average particle size of less than 0.05 μm may fail to exert modifying effect and a filler having an average particle size of more than 100 μm may largely impair surface nature or largely reduce mechanical characteristics.

The amount of a filler added is not particularly limited because it is determined depending on the film characteristics to be modified and the particle size of a filler. The amount of a filler is typically 0.01 to 200 parts by weight, preferably 0.01 to 100 parts by weight, and more preferably 0.02 to 80 parts by weight, with respect to 100 parts by weight of the polymer material component. A filler contained in an amount of less than 0.01 part by weight may fail to exert modifying effect and a filler contained in an amount of more than 200 parts by weight may largely reduce the mechanical characteristics of a film.

To add a filler to the layer 1 or the layer 2 of the multilayer conductive film of the present invention, the combination method can be applied as with the above, and a filler may be combined concurrently with the combination and dispersion of conductive particles.

The multilayer conductive film of the present invention may include the layer 1 and the layer 2 and may include additional layers in combination with the layer 1 and the layer 2. In such a case, the additional layer other than the layer 1 and the layer 2 is required to have conductivity. The additional layer other than the layer 1 and the layer 2 may employ any material as long as the material has conductivity and a material commonly used as a conductive layer may be used. An excess number of layers increase electric resistance of the multilayer conductive film in the thickness direction due to interface resistance between the layers and this is consequently likely to deteriorate battery performance. Thus, five or less layers are preferred. The layer 2 is preferably present on one surface because such a structure can exert durability against positive electrode potential.

The method for forming the multilayer conductive film of the present invention will next be described.

As a preferred embodiment of the present invention, examples of the method for forming each layer in a multilayer conductive film having a two-layer or three-layer structure include:

a) a method in which first, the layer 2 is formed, next a dissolved or melted conductive material 1 is formed on the layer 2, and then the formed layer is dried, as necessary;

b) a method in which first, the layer 1 is formed, next a dissolved or melted conductive material 2 or a dissolved or melted precursor of the conductive material 2 is applied onto the layer 1, then the formed layer is dried, as necessary, and the precursor is reacted, as necessary;

c) a method in which a dissolved or melted conductive material 1 and a dissolved or melted conductive material 2 or a dissolved or melted precursor of the conductive material 2 are applied onto a substrate by co-extruding, and the layers are dried, as necessary, and the precursor is reacted, as necessary;

d) a method in which the conductive material 1 is applied onto one surface of a film-like layer 3 by coating, extruding, or other techniques to form the layer 1, next solvents are evaporated, as necessary, then the conductive material 2 or a precursor of the conductive material 2 is applied onto the surface without the layer 1 of the layer 3 by coating, extruding, or other techniques to form the layer 2, then solvents are evaporated, as necessary, and the precursor of the conductive material 2 is reacted, as necessary; and e) a method in which the layer 1 and the layer 2 are separately produced and are bonded and combined by, for example, thermocompression bonding. These methods can be combined.

Corona treatment, plasma treatment, and other treatment may be appropriately performed in order to improve adhesion. From the viewpoint of productivity, a preferred method is first forming the layer 2, then forming a dissolved conductive material 1 on the layer 2, and evaporating solvents.

The method for producing the layer 1, specifically, the method for producing a film of the layer 1 will be described. The film can be formed by a known method usable in industrial fields and the method is not particularly limited. Examples of the method include a method of melting and forming the conductive material 1 containing the conductive particles 1 and the polymer material 1 having an alicyclic structure and a method of drying a dispersion solution of the conductive material 1 containing the conductive particles 1 and the polymer material 1 having an alicyclic structure on a substrate.

Examples of the method of melting and forming include melt extrusion methods such as a method using a T-die and an inflation method, calendering, heat pressing, and injection molding. Among them, the melt extrusion method using a T-die is preferred because a film to be obtained has small variation in thickness.

The film of the layer 1 formed by the method above may be used without stretching or may be stretched, for example, may be subjected to uniaxial stretching or biaxial stretching.

For a layer 2 employing a conductive material containing a polymer material and conductive particles, the method for producing the layer 2, specifically, the method for producing a film of the layer 2 will be described. The film can be formed by a known method usable in industrial fields and the method is not particularly limited. Examples of the method include a method of melting and extruding the polymer material 2 and the conductive particles 2 and a method of drying a dispersion solution of the polymer material 2 and the conductive particles 2 on a substrate.

To form a film that contains aromatic polyimide and carbon conductive particles and is a preferred embodiment of the layer 2, an exemplified method is forming a polyamic acid solution in which carbon conductive particles are dispersed into a polyimide film. Specifically, a polyamic acid solution in which carbon conductive particles are dispersed is cast on a substrate such as a metal drum or a metal belt by casting or other method; then the solution is dried at a temperature from room temperature to about 200° C. to yield a self-supporting dry film; and the film is fixed to a metal frame and is heated to a final temperature of about 400° C. to 600° C., thereby yielding a polyimide film. At the time, a polyamic acid structure is required to be chemically reacted into a polyimide structure. Examples of the reaction method include imidization by heating and chemical imidization using a dehydrating agent and a catalyst. Any method can be employed. Thermal curing is preferably performed at a higher temperature from the viewpoint of productivity because such a condition readily causes imidization to accelerate the curing. However, an excessively high temperature may cause thermal decomposition. An excessively low heating temperature is unlikely to promote imidization even by chemical curing and thus increases the time for the curing process.

The imidization time may be set so as to sufficiently complete substantial imidization and drying and is not unequivocally limited. An appropriate time is typically in a range from about 1 to 600 seconds.

The layer 2 obtained in the above procedure can be subjected to an appropriate treatment such as corona treatment and plasma treatment in order to improve adhesion to a layer 1, a positive electrode active material layer, or a negative electrode active material layer that are formed in the following processes.

The multilayer conductive film of the present invention preferably has a total thickness of 1 to 200 μm. A thickness of more than 200 μm is unfavorable because such a film may deteriorate the battery performance such as output density or increase the resistance in the thickness direction of the film to lead to the increase in internal resistance of a battery. A thickness of less than 1 μm is also unfavorable because such a film is difficult to be handled. The total thickness is more preferably 1 to 100 μm and even more preferably 2 to 50 μm because such a film has an excellent balance between strength and flexibility. The layer 1 preferably has a thickness of 0.1 μm or more. A film including a layer 1 having a thickness of less than 0.1 μm may be difficult to be handled. The layer 1 more preferably has a thickness of 0.5 μm or more and even more preferably 1 μm or more because such a film has excellent strength.

The multilayer conductive film of the present invention preferably has an electric resistance per unit area in the thickness direction of $10\Omega\cdot cm^2$ or less. A battery using the film having a resistance value of more than $10\Omega\cdot cm^2$ may have an increased internal resistance to thus reduce the output density. The electric resistance per unit area in the thickness direction is more preferably $5\Omega\cdot cm^2$ or less and even more preferably $1\Omega\cdot cm^2$ or less because such a film reduces the internal resistance of a battery to achieve excellent output density.

In order to prevent foreign substances from adhering to the multilayer conductive film of the present invention or to maintain physical properties of the film, a removable film may be attached onto a surface of the multilayer conductive film. The removable film is not particularly limited and a known film can be used. Examples of the film include synthetic resin films such as a PET film, a polytetrafluoroethylene film, a polyethylene film, and a polypropylene film.

The multilayer conductive film of the present invention is usable for a current collector, a tab, a container, and other members in a battery. Among them, a current collector is preferred because the film has stability in an equilibrium potential environment in a negative electrode and stability in an equilibrium potential environment in a positive electrode.

The multilayer conductive film of the present invention is preferably used for a current collector in a bipolar battery. Specifically, a positive electrode active material layer (positive electrode) is formed to be electrically connected to the face on the layer 2 and a negative electrode active material layer (negative electrode) is formed to be electrically connected to the other face, thereby constituting an electrode for a bipolar battery. The electrode for a bipolar battery is preferably used for a bipolar battery having a structure alternately stacking electrolyte layers.

The structures of a positive electrode and a negative electrode are not particularly limited and a known positive electrode and a known negative electrode can be used. The electrode as a positive electrode includes a positive electrode active material, and the electrode as a negative electrode includes a negative electrode active material. The positive electrode active material and the negative electrode active material can be appropriately selected depending on the type of a battery For example, for a battery as a lithium ion battery, examples of the positive electrode active material include Li—Co composite oxides such as $LiCoO_2$, Li—Ni composite oxides such as $LiNiO_2$, Li—Mn composite oxides such as spinel $LiMn_2O_4$, and Li—Fe composite oxides such as $LiFeO_2$. Additional examples include phosphate compounds and sulfate compounds of a transition-metal and lithium, such as $LiFePO_4$; oxides and sulfides of a transition-metal, such as $V_2O_5$, $MnO_2$, $TiS_2$, $MoS_2$, and $MoO_3$; and $PbO_2$, AgO, and NiOOH. Under certain circumstances, two or more positive electrode active materials can be used in combination.

Examples of the negative electrode active material include carbon materials such as a crystalline carbon material and an amorphous carbon material and metal materials such as a composite oxide of lithium and a transition metal, including $Li_4Ti_5O_{12}$. Specific examples include natural graphite, artificial, graphite, carbon black, activated carbon, carbon fiber, coke, soft carbon, and hard carbon. Under certain circumstances, two or more negative electrode active materials can be used in combination.

The electrode may include additional components such as a conductive auxiliary agent, an ion-conducting polymer, and a supporting electrolyte. Examples of the conductive auxiliary agent include acetylene black, carbon black, and graphite. Adding a conductive auxiliary agent can increase the conductivity of electrons generated in the electrode to thus improve battery performance. Examples of the ion-conducting polymer include polyethylene oxide (PEO) and polypropylene oxide (PPO). The supporting electrolyte can be selected depending on the type of a battery. For a battery as a lithium battery, examples of the supporting electrolyte include $LiBF_4$, $LiPF_6$, $Li(SO_2CF_3)_2N$, and $LiN(SO_2C_2F_5)_2$.

The amounts of constituent materials in the electrode, such as an active material, a Lithium salt, and a conductive auxiliary agent are preferably determined in consideration of the intended purpose (for example, output power-oriented or energy-oriented) of a battery and ionic conductivity.

The electrolyte layer may be in any of a liquid phase, a gel phase, and a solid phase. In consideration of safety when a battery is broken and prevention of liquid junction, the electrolyte layer is preferably a gel polymer electrolyte layer or an all-solid-state electrolyte layer.

The electrolyte using a gel polymer electrolyte layer loses flowability and this can suppress the outflow of the electrolyte to a current collector and can block ionic conductivity between layers. Examples of a host polymer for the gel polymer electrolyte include PEO, PPO, PVDF, a polyvinylidene fluoride-hexafluoropropylene copolymer (PVDF-HFP), PAN, PMA, and PMMA. A usable plasticizer is an electrolytic solution typically used in a lithium ion battery.

The gel polymer electrolyte is produced by adding an electrolytic solution typically used in a lithium ion battery to an all-solid-state polymer electrolyte such as PEO and PPO. The gel polymer electrolyte may also be produced by supporting an electrolytic solution in the skeleton of a polymer without lithium ion conductivity, such as PVDF, PAN, and PMMA. The ratio of the polymer and the electrolytic solution constituting a gel polymer electrolyte is not particularly limited, and all intermediate gel polymer electrolytes between the all-solid-state polymer electrolyte containing 100% of a polymer and the liquid electrolyte containing 100% of an electrolytic solution are included in the concept of the gel polymer electrolyte. The all-solid-state electrolyte includes each electrolyte having Li ion conductivity, such as a polymer and an inorganic solid.

The electrolyte using an all-solid-state electrolyte layer loses flowability and this can eliminate the outflow of the electrolyte to a current collector and can block ionic conductivity between layers.

The electrolyte layer preferably contains a supporting electrolyte in order to maintain ionic conductivity. For a battery as a lithium ion battery, usable examples of the supporting electrolyte include, but are not limited to, $LiBF_4$, $LiPF_6$, $LiN(SO_2CF_3)_2$, $LiN(SO_2C_2F_5)_2$, or a mixture of them. A polyalkylene oxide polymer such as PEO and PPO can well dissolve lithium salts such as $LiBF_4$, $LiPF_6$, $LiN(SO_2CF_3)_2$, and $LiN(SO_2C_2F_5)_2$ as described above. Forming a cross-linked structure exerts excellent mechanical strength.

A plurality of batteries may be combined in series, in parallel, or in series and parallel to thus form an assembled battery. Connecting in series or in parallel allows capacity and voltage to be freely controlled.

The number of batteries and the connection manner in an assembled battery may be designed depending on the intended output power and capacity of a battery. Forming an assembled battery increases the stability as a battery as compared with a unit cell. The formation of an assembled battery can reduce the deterioration effect caused by a cell on all batteries.

The battery or the assembled battery can be preferably used as a power source for driving vehicles. Using the battery or the assembled battery of the present invention in a hybrid vehicle or an electric vehicle can increase lifetime and reliability of the vehicle. However, the application is not limited to vehicles and, for example, the battery can be used for trains.

EXAMPLES

Advantageous effects of the present invention will be described in further detail based on examples and comparative examples, but the present invention is not limited to the examples. A person skilled in the art can make various changes, modifications, and alterations without departing from the scope of the invention.

Electric resistance per unit area in the thickness direction, barrier properties for a solvent of an electrolytic solution, durability against negative electrode potential (negative electrode potential durability), durability against positive electrode potential (positive electrode potential durability), relative irreversible capacity of a half cell, barrier properties of a component (lithium element) contained in an electrolytic solution, and warpage degree and interlayer adhesion of a multilayer conductive film of each conductive film obtained in Examples and Comparative Examples were determined and evaluated by the below methods.

(Electric Resistance Per Unit Area in Thickness Direction)

A conductive film was cut into a 15-mm square, and on an area of 10-mm square at the central part on each face of the cutout film, a gold thin layer was formed by sputtering. With each gold thin layer, a copper foil was brought into close contact while a pressure of 1 MPa was applied, and the electric voltage V was determined when an electric current 1 was supplied across two copper foils (LCR HiTESTER (registered trademark) 3522-50, manufactured by Hioki E. E. Corporation). The ratio of measurement values V/I was regarded as the electric resistance per unit area in the thickness direction.

(Barrier Properties for Solvent of Electrolytic Solution)

Each single layer film was cut into a disk having a diameter of 8 cm, which was used as a sample film.

For the solvent barrier property test, the following jigs (each sign in parentheses corresponds to the sign in FIG. 1):

Teflon block (1): a column-shaped Teflon block ("Teflon" is a registered trademark) having a diameter of 10 cm and a height of 2 cm and including one end having a circular groove with a diameter of 4 cm and a depth of 1 cm.

O-ring (2): an O-ring having an inner diameter of 4.44 cm and a thickness of 0.31 cm.

Film holder (4): a film holder made of SUS304 and having an inner diameter of 4 cm, an outer diameter of 10 cm, and a thickness of 0.2 mm.

The solvent permeation amount was determined by the procedure below.

Into a groove of a Teflon block (1), 0.5 g of a carbonate solvent (5) was charged and an O-ring (2), a sample film (3), and a film holder (4) were stacked on the solvent in this order. Pressure was applied between the film holder (4) and the Teflon block (1) so as to prevent the carbonate solvent (5) from leaking from clearances between the O-ring (2), the sample film (3), and the Teflon block (1). The test set was reversed so as to dispose the film holder (4) at the lower position (FIG. 1), and the total weight was determined. Then, the test set was left in a condition shown in FIG. 1 in an atmosphere of dry air and at 25° C. for 2 weeks and then was weighed again. The difference in weight was regarded as the solvent permeation amount. A sample film having a solvent permeation amount of 100 mg or less has excellent barrier properties for a solvent of an electrolytic solution. In the test, a film has an area in contact with the solvent of 16.6 $cm^2$.

(Negative Electrode Potential Durability)

The electrode cell used was a flat cell (Hohsen Corporation). The counter electrode used was a cylindrical Li foil having a diameter of 15 mm and a thickness of 0.5 mm; the separator used was a cutout Celgard 2500 (made of PP, Celgard) having a disk shape with a diameter of 19 mm; the work electrode was a cutout conductive film produced in Example or Comparative Example and having a disk shape with a diameter of 30 mm; and the electrolytic solution used was 1 mol/L of $LiPF_6$ solution in a mixture of ethylene carbonate and diethyl carbonate (volume ratio 3:7, trade name LBG-94913, Kishida Chemical Co., Ltd.)

A cell was produced in an argon atmosphere by the following procedure. In a cell, a counter electrode, a separator impregnated with an electrolytic solution, and a work electrode were stacked in this order. Here, the counter electrode and the separator were in contact with each other in a circular region having a diameter of 15 mm alone and the work electrode and the separator were in contact with each other in a circular region having a diameter of 16 mm alone. This prevented the work electrode from being in contact with the counter electrode. Next, each of the counter electrode and the work electrode was connected to a SUS304 electrode (regarded as an electrode A and an electrode B, respectively), and the cell was sealed so as to prevent gas from passing the cell.

Measurement was carried out by the following procedure. The cell was disposed in a constant temperature oven at 55° C. and left for 1 hour. Then, the electrodes A and B in the cell were connected to Multistat 1470E manufactured by Solartron. Next, a constant current of 20.1 μA was supplied from the electrode B to the electrode A while the potential difference between the electrode A and the electrode B was monitored. Here, the time until the potential difference between the electrode A and the electrode B reached 5 mV was determined. The time until the potential difference reached 5 mV that was determined by using copper foil (20 μm thick) typically used as the current collector in a lithium ion battery was regarded as 1, and the time until the potential difference reached 5 mV determined by using a sample for measurement was regarded as the time until the film reached negative electrode potential as compared with the copper foil. A film having a time until reaching negative electrode potential as compared with the copper foil of 10 or less has excellent durability against negative electrode potential.

(Positive Electrode Potential Durability)

The structure and the production procedure of a cell were the same as in the test method for the negative electrode potential durability.

Measurement was carried out by the following procedure. The cell was disposed in a constant temperature oven at 55° C. and left for 1 hour. Then, the electrodes A and B of the cell were connected to Multistat 1470E manufactured by Solartron. Next, a constant potential was maintained so that the potential of the electrode A with respect to the electrode B was 4.2 V, then the current a after 1 minute and the current b after 1 day were determined, and the ratio b/a was calculated. A film having a ratio b/a of ½ or less is regarded to have durability against positive electrode potential.

(Relative Irreversible Capacity of Half Cell)

1. Preparation of Negative Electrode Active Material Slurry

To 95 parts by weight of artificial graphite as a negative electrode active material and 5 parts by weight of polyvinylidene fluoride (KF9130: manufactured by Kureha Corporation) as a binder, 95 parts by weight of N-methyl-2-pyrrolidone (manufactured by Wako Pure Chemical Industries, Ltd.) was added and the whole was stirred and degassed to thus yield a negative electrode active material slurry.

2. Preparation of Negative Electrode

A conductive film was cut into a disk shape having a diameter of 15 mm. Next, the negative electrode active material slurry prepared in the step 1 was applied onto the center of the layer 1 with a doctor blade so as to give a diameter of 8 mm and a thickness of 130 μm, and then the coating was dried and pressed to thus yield a negative electrode having the negative electrode active material layer.

3. Preparation of Battery

The electrode cell used was a flat cell (Hohsen Corporation). The counter electrode used was a cylindrical Li foil having a diameter of 15 mm and a thickness of 0.5 mm; the separator used was a cutout Celgard 2500 (made of PP, Celgard) having a disk shape with a diameter of 19 mm; the negative electrode used was the negative electrode prepared in the step 2; and the electrolytic solution used was 1 mol/L of $LiPF_6$ solution in a mixture of ethylene carbonate and diethyl carbonate (volume ratio 3:7, trade name: LBG-94913, Kishida Chemical Co., Ltd.)

A cell was produced in an argon atmosphere by the following procedure. In a cell, a counter electrode, a separator impregnated with an electrolytic solution, and a negative electrode were stacked in this order. Here, the negative electrode active material layer was in contact with the separator and the layer 2 was not in contact with the electrolytic solution. Next, each of the counter electrode and the negative electrode was connected to a SUS304 electrode (regarded as an electrode A and an electrode B, respectively), and the cell was sealed so as to prevent gas from passing the cell.

4. Charge and Discharge Measurement

The measurement was carried out by the following procedure. A cell was disposed in a constant temperature oven at 45° C.

The cell was charged at 25° C. in a constant-current constant-voltage system (CCCV, current: 0.1 C, voltage: 0.005 V) for 12 hours. Then, the cell was discharged at a constant current (CC, current: 0.1 C) to 1.5 V. The charge and discharge process was regarded as 1 cycle and the cycle was repeated three times.

The difference between the charging capacity in the third cycle and the discharging capacity in the third cycle was normalized by the mass of the active material and the normalized value was regarded as irreversible capacity. The irreversible capacity determined by using copper foil (20 μm thick) typically used as the current collector in a lithium ion battery was regarded as 1, and the irreversible capacity of a sample for measurement was calculated as the relative irreversible capacity with respect to the irreversible capacity of copper foil. A film having a small relative irreversible capacity can be evaluated to have excellent cycle characteristics when a battery is prepared.

(Barrier Properties for Component Contained in Electrolytic Solution)

The electrode cell used was a flat cell (Hohsen Corporation). The counter electrode used was a cylindrical Li foil having a diameter of 15 mm and a thickness of 0.5 mm; the separator used was a cutout Celgard 2500 (made of PP, Celgard) having a diameter of 19 mm; the work electrode used was a cutout conductive film having a diameter of 30 mm; and the electrolytic solution used was 1 mol/L of $LiPF_6$ solution in a mixture of ethylene carbonate and diethyl carbonate (LBG-96533, Kishida Chemical Co., Ltd.)

A cell was produced in an argon atmosphere by the following procedure. In a cell, a counter electrode, a separator impregnated with an electrolytic solution, and a work electrode were stacked in this order. Here, the counter electrode and the separator were in contact with each other in a circular region having a diameter of 15 mm alone and the work electrode and the separator were in contact with each other in a circular region having a diameter of 16 mm. This prevented the work electrode from being in contact with the counter electrode. The work electrode was provided so that the separator was in contact with the layer 1 of the multilayer conductive film. Next, each of the counter electrode and the work electrode was connected to a SUS304 electrode (regarded as an electrode A and an electrode B, respectively), and the cell was sealed so as to prevent gas from passing the cell.

A sample for analysis was prepared by the following procedure. A cell was disposed in a constant temperature oven at 55° C. and left for 1 hour. Then, the electrodes A and B of the cell were connected to Multistat 1470E manufactured by Solartron. Next, a constant current of 20.1 μA was continuously supplied from the electrode B to the electrode A while the potential difference between the electrode A and the electrode B was monitored until the potential difference between the electrode A and the electrode B reached 5 mV. Subsequently, a current was further controlled for 1 week so that the potential difference between the electrode A and the electrode B maintained 5 mV. Then, the (multilayer) conductive film alone was taken out of the cell; the adhering electrolytic solution was removed; then the film was embedded in a resin; a cross-sectional slice was prepared with a microtome; the distribution of a lithium element in the cross-sectional slice was observed by time-of-flight secondary ion mass spectrometry using TOF.SIMS 5 manufactured by ION-TOF; and the penetration depth of a lithium element from the film surface was determined. A film having a lithium element penetration depth of 5 μm or less was judged to have excellent barrier properties for a component contained in an electrolytic solution.

(Warpage Degree of Multilayer Conductive Film)

In a dry room with a dew point of about −40° C., each multilayer conductive film (sealed and stored in an aluminum foil zipper pouch immediately after the production) produced in Examples 10 to 19 and Reference Examples 5 to 7 was cut into a 5-cm square. The cutout film was left on a horizontal plate and the average distance from each top to the plate surface was calculated as the warpage of the multilayer conductive film. The warpage was measured while the film was left in a direction where each top rose from the plate. A film, which had an excessively large warpage, was wound once or more was evaluated as ×(NG). The warpage was measured after drying in a low-humidity environment. A multilayer conductive film having a warpage of 5 mm or less is evaluated as excellent.

(Interlayer Adhesion of Multilayer Conductive Film)

The multilayer conductive film was cut into a size of 2 cm×4 cm; a strong adhesive aluminum tape was bonded onto the layer 1; and the aluminum tape bonded to the layer 1 and the layer 2 were peeled off in a longitudinal direction with a tension tester while maintaining a T-shape, thereby determining the interlayer adhesion force of the multilayer conductive film. A film having an interlayer adhesion force of 0.7 N/20 mm or more is evaluated to have excellent interlayer adhesion.

Synthesis Example 1

Pyromellitic dianhydride (PMDA) as a tetracarboxylic dianhydride and 4,4'-oxydianiline (ODA) as a diamine were used as starting materials, and N,N-dimethylformamide (DMF) was used as a solvent.

Into a glass flask having a volume of 2,000 ml, 681 g of DMF and 90.46 g of ODA were charged and the mixture was stirred to dissolve ODA. Then, 96.57 g of PMDA was added and the mixture was further stirred to thus prepare a reaction solution. Separately, a slurry containing 30 g of DMF and 1.97 g of PMDA was prepared. The slurry was added to the reaction solution while the viscosity was carefully observed. The addition and stirring were stopped when the viscosity reached 200 Pa•s, yielding a polyamic acid solution having a resin solid content concentration of 21% by weight.

Into a zirconia container, 46.8 g of the obtained polyamic acid solution, 6.55 g of Ketjenblack (EC600JD, manufactured by Lion. Corporation), 197 g of DMF, and 500 g of zirconia balls having a diameter of 5 mm were charged and the mixture was subjected to ball mill dispersion. The dispersion condition was at a rotation speed of 600 rpm for 30 minutes.

To the mixture, 265 g of the polyamic acid solution was further added and the mixture was stirred to yield a homogeneous carbon conductive particle-dispersed polyamic acid solution.

The carbon conductive particle-dispersed polyamic acid solution was cast on a PET film (SG-1, manufactured by Panac Co., Ltd.) having a thickness of 125 μm so as to give a final thickness of 25 μm and the film was dried at 70° C. for 10 minutes. The self-supporting film after drying was released from PET and then was fixed to a metal pin frame. The film was dried at from 160° C. to 300° C. over 7 minutes 30 seconds and was subsequently dried and imidized at 400° C. for 3 minutes, thereby yielding a single layer film (25 μm thick) as the layer 2.

Synthesis Example 2

As starting materials, 3,3',4,4'-biphenyltetracarboxylic dianhydride (BPDA) as a tetracarboxylic dianhydride and 4,4'-oxydianiline (ODA) as a diamine were used, and N,N-dimethylacetamide (DMAc) was used as a solvent.

Into a glass flask having a volume of 2,000 ml, 735 g of DMAc and 54.66 g of ODA were charged and the mixture was stirred to dissolve ODA. Then, 78.73 g of BPDA was added and the mixture was further stirred. Separately, a slurry containing 30 g of DMAc and 1.61 g of BPDA was prepared. The slurry was added to the reaction solution while the viscosity was carefully observed. The addition and stirring were stopped when the viscosity reached 200 Pa•s, yielding a polyamic acid solution having a resin solid content concentration of 15% by weight.

Into a zirconia container, 80.6 g of the obtained polyamic acid solution, 8.06 g of Ketjenblack (EC600JD, manufactured by Lion Corporation), 161 g of DMF, and 500 g of zirconia balls having a diameter of 5 mm were charged and the mixture was subjected to ball mill dispersion. The dispersion condition was at a rotation speed of 600 rpm for 30 minutes.

To the mixture, 457 g of the polyamic acid solution was further added and the mixture was stirred to yield a homogeneous carbon conductive particle-dispersed polyamic acid solution.

To 50 g of the carbon conductive particle-dispersed polyamic acid solution, the total amount of a cure solvent containing 2.5 g of isoquinoline, 9.52 g of acetic anhydride, and 2.5 g of DMF was added and the mixture was well stirred in an ice bath. The mixture was cast on an aluminum foil having a thickness of 40 μm so as to give a final thickness of 25 μm and the film was dried at 160° C. for 70 seconds. The self-supporting film after drying was released from the aluminum foil and then was fixed to a metal pin frame. The film was dried at 300° C. for 11 seconds and was subsequently dried and imidized at 450° C. for 1 minute, thereby yielding a single layer film (25 μm) as the layer 2.

Synthesis Example 3

Into a zirconia container, 44 g of cycloolefin polymer (trade name: ZEONOR 1410R, manufactured by ZEON Corporation), 6.6 g of Ketjenblack (trade name: EC600JD, manufactured by Lion. Corporation), 176 g of ethylcyclohexane, and 450 g of zirconia balls having a diameter of 5 mm were added and the mixture was subjected to ball mill dispersion to yield a conductive material (dispersion liquid). The dispersion condition was at a rotation speed of 500 rpm for 45 minutes.

The conductive material was cast with a coating apparatus (Comma Coater; registered trademark, manufactured by Hirano Tecseed Co., Ltd.) on an aluminum foil so as to give a final thickness of 15 μm and the film was dried at 80° C. for 5 minutes and was subsequently heated at 230° C. for 10 minutes. Then, the aluminum foil was removed, thereby yielding a single layer film (15 μm thick) as the layer 1.

Example 1

The conductive material synthesized in Synthesis Example 3 was cast with a coating apparatus (Comma Coater; registered trademark, manufactured by Hirano Tecseed Co., Ltd.) on the single layer film as the layer 2 synthesized in Synthesis Example 1 so as to give a final thickness of 15 μm and the film was dried at 80° C. for 5 minutes and subsequently heated at 230° C. for 10 minutes, thus yielding a multilayer conductive film (40 μm thick).

The obtained multilayer conductive film was subjected to measurements of the electric resistance per unit area in the thickness direction, the negative electrode potential durability, the positive electrode potential durability, and the relative irreversible capacity of a half cell. In the negative electrode potential durability test, the work electrode was installed so that the separator was in contact with the layer 1 and the time until the film reached negative electrode potential as compared with copper foil, was determined. In the positive electrode potential durability test, the work electrode was installed so that the separator was in contact with the layer 2 and b/a was calculated.

The solvent permeability of the layer 1 was determined by using the single layer film (15 μm thick) as the layer 1 obtained in Synthesis Example 3.

Synthesis Example 4

A conductive material and a single layer (15 μm thick) as the layer 1 were obtained in a similar manner to that in Synthesis Example 3 except that the cycloolefin polymer (trade name: ZEONOR 1410, manufactured by ZEON Corporation) used in Synthesis Example 3 was replaced with cycloolefin polymer (trade name: ZEONOR 1020, manufactured by ZEON Corporation).

Example 2

A multilayer conductive film (40 μm thick) was obtained in a similar manner to that in Example 1 except that the conductive material of Synthesis Example 3 used in Example 1 was replaced with the conductive material of Synthesis Example 4. The obtained film was subjected to the same measurement and evaluation as in Example 1.

Synthesis Example 5

A conductive material and a single layer film (15 μm thick) as the layer 1 were obtained in a similar manner to that in Synthesis Example 3 except that the cycloolefin polymer (trade name: ZEONOR 1410R, manufactured by ZEON Corporation) used in Synthesis Example 3 was replaced with cycloolefin polymer (trade name: ZEONEX 480R, manufactured by ZEON Corporation).

Example 3

A multilayer conductive film (40 μm thick) was obtained in a similar manner to that in Example 1 except that the conductive material of Synthesis Example 3 used in Example 1 was replaced with the conductive material of Synthesis Example 5. The obtained film was subjected to the same measurement and evaluation as in Example 1.

Synthesis Example 6

A conductive material and a single layer film (15 μm thick) as the layer 1 were obtained in a similar manner to that in Synthesis Example 3 except that the cycloolefin polymer (trade name: ZEONOR 1410R, manufactured by ZEON Corporation) used in Synthesis Example 3 was replaced with cycloolefin polymer (trade name: ARTON F5023, manufactured by JSR Corporation).

Example 4

A multilayer conductive film (40 μthick) was obtained in a similar manner to that in Example 1 except that the conductive material of Synthesis Example 3 used in Example 1 was replaced with the conductive material of Synthesis Example 6. The obtained film was subjected to the same measurement and evaluation as in Example 1.

Synthesis Example 7

A conductive material and a single layer film (15 μm thick) as the layer 1 were obtained in a similar manner to that in Synthesis Example 3 except that the cycloolefin polymer (trade name: ZEONOR 1410R, manufactured by ZEON Corporation) used in Synthesis Example 3 was replaced with cycloolefin copolymer (trade name: APL APL6013T, manufactured by Mitsui Chemicals, Inc.)

Example 5

A multilayer conductive film (40 μm thick) was obtained in a similar manner to that in Example 1 except that the conductive material of Synthesis Example 3 used in Example 1 was replaced with the conductive material of Synthesis Example 7. The obtained film was subjected to the same measurement and evaluation as in Example 1.

Example 6

A multilayer conductive film (40 μm thick) was obtained in a similar manner to that in Example 1 except that the film as the layer 2 synthesized in Synthesis Example 1 used in Example 1 was replaced with the film as the layer 2 synthesized in Synthesis Example 2. The obtained film was subjected to the same measurement and evaluation as in Example 1.

Synthesis Example 8

Into a zirconia container, 58 g of polyisobutylene (trade name: EP400, manufactured by Kaneka Corporation), 6.4 g of Ketjenblack (trade name: EC600JD, manufactured by Lion Corporation), 192 g of toluene, and 500 g of zirconia balls having a diameter of 5 mm were charged and the mixture was subjected to ball mill dispersion to thus yield a conductive material. The dispersion condition was at a rotation speed of 500 rpm for 45 minutes. To the mixture, 5.95 g of hardener, 0.11 g of retarder (trade name: Surfynol 61, manufactured by Nissin Chemical Industry Co., Ltd.), and 0.077 g of curing catalyst (trade name: Pt-VTS-3.0X, manufactured by Umicore Japan) were further added and the mixture was stirred and degassed to thus yield a conductive material.

The hardener used herein is a compound in which the average number of hydrosilyl groups is about 5.5 per molecule and that is obtained by adding 2 equivalents of α-olefin based on the total hydrosilyl group amount to methylhydrogen silicone having 7.5 (—Si—O—) repeating units on the average number in the presence of a platinum catalyst. The compound had a Si—H group content of 6 mmol/g.

Comparative Example 1

The conductive material synthesized in Synthesis Example 8 was applied with a wire bar (Rod No. 30, a coating speed of 1 cm/sec) onto the single layer film (25 μm) as the layer 2 produced in Synthesis Example 1 so as to give a thickness of 15 μm and the coating was dried at 150° C. for 10 minutes to yield a multilayer conductive film (40 μm thick). The obtained film was subjected to the same measurement and evaluation as in Example 1.

Comparative Example 2

The single layer film (15 μm thick) as the layer 1 synthesized in Synthesis Example 3 was evaluated.

The single layer film as the layer 1 was subjected to measurements of the electric resistance per unit area in the thickness direction, the negative electrode potential durability, the positive electrode potential durability, and the solvent permeability.

Comparative Example 3

The single layer film as the layer 2 synthesized in Synthesis Example 1 (25 μm) was evaluated.

The single layer film as the layer 2 was subjected to measurements of the electric resistance per unit area in the thickness direction, the negative electrode potential durability, the positive electrode potential durability, the relative irreversible capacity of a half cell, and the solvent permeability. The single layer film as the layer 2 unfortunately failed to reach 5 mV even after a week measurement in the negative electrode potential durability test, thus suggesting no durability against negative electrode potential.

Comparative Example 4

Pellets of polypropylene resin containing carbon black (trade name: LEOPOUND Grade F1020, manufactured by Lion Corporation) were used and subjected to hot pressing (160° C.) to yield a single layer film as the layer 1 having a thickness of about 90 μm.

One face of the obtained single layer film as the layer 1 and one face of the single layer film (25 μm thick) as the layer 2 obtained in Synthesis Example 1 were subjected to corona treatment. Next, the faces with the corona treatment were brought into contact with each other and the single layer film as the layer 1 and the single layer film as the layer 2 were bonded by thermocompression bonding to thus yield a multilayer conductive film (115 μm).

The obtained multilayer conductive film was subjected to measurements of the electric resistance per unit area in the thickness direction, the negative electrode potential durability, and the positive electrode potential durability. In the negative electrode potential durability test, the work electrode was installed so that the separator was in contact with the layer 1 and the time until the film reached negative electrode potential as compared with copper foil was determined. In the positive electrode potential durability test, the work electrode was installed so that the separator was in contact with the layer 2 and b/a was calculated. The solvent permeability of the layer 1 was determined by using the single layer film as the layer 1.

Table 1 shows the results of Examples 1 to 6 and Comparative Examples 1 to 4.

The single layer film as the layer 2 (Comparative Example 3) obtained in Synthesis Example 1 had a large relative irreversible capacity of a half cell and poor cycle characteristics when a battery was produced as compared with the multilayer conductive films obtained in Examples 1 to 6. This suggests that the durability against negative electrode potential is required to improve the cycle characteristics.

Synthesis Example 9

In 30 g of ethylcyclohexane, 10 g of cycloolefin polymer (trade name: ZEONOR 1410R, manufactured by ZEON Corporation) was dissolved and 10 g of nickel powder (Ni-255, an average particle size of 2.2 μm, manufactured by Fukuda Metal Foil & Powder Co., Ltd.) was added. The mixture was dispersed and degassed with a planetary centrifugal mixer (Thinky Corporation MIXER ARE-310, manufactured by THINKY) to yield a dispersion liquid. The dispersion condition was at an orbital speed of 2,000 rpm for 90 seconds.

Synthesis Example 10

A dispersion liquid was obtained in a similar manner to that in Synthesis Example 9 except that the nickel powder used in Synthesis Example 9 was replaced with silver powder (SF—K, an average particle size of 4.3 μm, manufactured by Mitsui Mining & Smelting Co., Ltd.)

Synthesis Example 11

A dispersion liquid was obtained in a similar manner to that in Synthesis Example 9 except that the nickel powder used in Synthesis Example 9 was replaced with copper powder (Cu—HWF-6, an average particle size of 6.13 μm, manufactured by Fukuda Metal Foil & Powder Co., Ltd.)

Synthesis Example 12

A dispersion liquid was obtained in a similar manner to that in Synthesis Example 9 except that the nickel powder used in Synthesis Example 9 vas replaced with titanium carbide powder (TiC, an average particle size of 1.86 μm, manufactured by Japan New Metals Co., Ltd.)

TABLE 1

|  | Example | | | | | | Comparative Example | | | |
| --- | --- | --- | --- | --- | --- | --- | --- | --- | --- | --- |
|  | 1 | 2 | 3 | 4 | 5 | 6 | 1 | 2 | 3 | 4 |
| Electric resistance per unit area ($m\Omega \cdot cm^2$) | 40 | 45 | 50 | 40 | 50 | 35 | 80 | 30 | 25 | 1900 |
| Solvent barrier properties (mg) | 1.3 | 2.5 | 3 | 5 | 10 | 1.3 | 4000 | 1.3 | 0.1 | 420 |
| Negative electrode potential durability | 3 | 4 | 4.5 | 5 | 5 | 3 | 4 | 3 | — | 1.5 |
| Positive electrode potential durability (b/a) | 0.03 | 0.03 | 0.03 | 0.03 | 0.03 | 0.03 | 0.03 | 1.2 | 0.03 | 0.03 |
| Relative irreversible capacity of half cell | 1 | 1.2 | 1.5 | 1.8 | 2 | 1 | 4 | — | 10 | — |

The multilayer conductive film obtained in Comparative Example 1 had a large relative irreversible capacity of a half cell and poor cycle characteristics when a battery was produced as compared with the multilayer conductive films obtained in Examples 1 to 6. This suggests that the barrier properties for a solvent of an electrolytic solution are required to improve the cycle characteristics.

Synthesis Example 13

As starting materials, 3,3',4,4'-biphenyltetracarboxylic dianhydride (BPDA) as a tetracarboxylic dianhydride and 4,4'-oxydianiline (ODA) as a diamine were used, and N,N-dimethylacetamide (DMAc) was used as a solvent.

Into a glass flask having a volume of 2,000 ml, 735 g of DMAc and 54.66 g of ODA were charged and the mixture was stirred to dissolve ODA. Then, 78.73 g of BPDA was added and the mixture was further stirred. Separately, a slurry containing 30 g of DMAc and 1.61 g of BPDA was prepared. The slurry was added to the reaction solution while the viscosity was carefully observed. The addition and stirring were stopped when the viscosity reached 200 Pa•s, yielding a polyamic acid solution having a resin solid content concentration of 15%.

The obtained polyamic acid solution, Ketjenblack (EC600JD, manufactured by Lion Corporation), and DMF were mixed in a weight ratio of 10:1:20 and the mixture was subjected to ball mill dispersion with zirconia balls having a diameter of 5 mm. The dispersion condition was 250 g of batch, 500 g of zirconia balls, and at a rotation speed of 600 rpm for 30 minutes.

To the mixture, the polyamic acid solution was further added in an amount in terms of a weight ratio of 56.67 and the mixture was stirred to yield a homogeneous carbon conductive particle-dispersed polyamic acid solution.

To 50 g of the carbon conductive particle-dispersed polyamic acid solution, the total amount of a cure solvent containing 2.5 g of isoquinoline, 9.52 g of acetic anhydride, and 2.5 g of DMF was added and the mixture was well stirred in an ice bath. The mixture was cast on an aluminum foil having a thickness of 40 μm so as to give a final thickness of 25 μm and the film was dried at 160° C. for 70 seconds. The self-supporting film after drying was released from the aluminum foil and then was fixed to a metal pin frame. The film was dried at 300° C. for 11 seconds and, subsequently dried and imidized at 450° C. for 1 minute. The film was allowed to cool and then was subjected to surface corona treatment, thereby yielding a single layer film as the layer 2.

Reference Example 1

The dispersion liquid obtained in Synthesis Example 11 was cast with Comma Coater on an aluminum foil so as to give a final thickness of 6 μm and the film was dried at 80° C. for 4 minutes. The aluminum foil was removed and the film was subsequently heated in vacuo at 180° C. for 4 minutes to thus yield a conductive film (layer 1).

The obtained conductive film was subjected to measurements of the electric resistance per unit area in the thickness direction, the negative electrode potential durability, the barrier properties for a solvent of an electrolytic solution, and the barrier properties for a component contained in an electrolytic solution.

Reference Example 2

The dispersion liquid obtained in Synthesis Example 12 was cast with Comma Coater on an aluminum foil so as to give a final thickness of 11 μm and the film was dried at 80° C. for 4 minutes. The aluminum foil was removed and the film was subsequently heated in vacuo at 180° C. for 4 minutes to thus yield a conductive film (layer 1).

The obtained conductive film was subjected to measurements of the electric resistance per unit area in the thickness direction, the negative electrode potential durability, the barrier properties for a solvent of an electrolytic solution, and the barrier properties for a component contained in an electrolytic solution.

Example 7

The dispersion liquid obtained in Synthesis Example 9 was cast with Comma Coater on an aluminum foil (a thickness of 30 μm, hereinafter called "layer 2") so as to give a final total thickness of 48 μm. The film was dried at 80° C. for 4 minutes and subsequently heated at 120° C. for 4 minutes and at 180° C. for 4 minutes to thus form a layer 1 on the layer 2, thereby yielding a multilayer conductive film.

The obtained multilayer conductive film was subjected to measurements of the electric resistance per unit area in the thickness direction, the negative electrode potential durability, the positive electrode potential durability, and the barrier properties for a component contained in an electrolytic solution. For the measurements of the negative electrode potential durability and the barrier properties for a component contained in an electrolytic solution, the work electrode was installed so that the separator was in contact with the layer 1. In the positive electrode potential durability test, the work electrode was installed so that the separator was in contact with the layer 2 and b/a was calculated.

Example 8

A multilayer conductive film was obtained in a similar manner to that in Example 7 except that the dispersion liquid obtained in Synthesis Example 9 used in Example 7 was replaced with the dispersion liquid obtained in Synthesis Example 10.

The obtained multilayer conductive film was subjected to measurements of the electric resistance per unit area in the thickness direction, the negative electrode potential durability, the positive electrode potential durability, and the barrier properties for a component contained in an electrolytic solution. For the measurements of the negative electrode potential durability and the barrier properties for a component contained in an electrolytic solution, the work electrode was installed so that the separator was in contact with the layer 1. In the positive electrode potential durability test, the work electrode was installed so that the separator was in contact with the layer 2 and b/a was calculated.

Example 9

The dispersion liquid obtained in Synthesis Example 9 was cast with Comma Coater on a film (a thickness of 25 μm, hereinafter called "layer 2") obtained in Synthesis Example 13 so as to give a final total thickness of 43 μm. The film was dried at 80° C. for 4 minutes and subsequently heated at 120° C. for 4 minutes and at 180° C. for 4 minutes to thus form a layer 1 on the layer 2, thereby yielding a multilayer conductive film.

The obtained multilayer conductive film was subjected to measurements of the electric resistance per unit area in the thickness direction, the negative electrode potential durability, the positive electrode potential durability, and the barrier properties for a component contained in an electrolytic solution. For the measurements of the negative electrode potential durability and the barrier properties for a component contained in an electrolytic solution, the work electrode was installed so that the separator was in contact with the layer 1. In the positive electrode potential durability test, the work electrode was installed so that the separator was in contact with the layer 2 and b/a was calculated.

Example 10

A multilayer conductive film was obtained in a similar manner to that in Example 7 except that the dispersion liquid obtained in Synthesis Example 3 was used to form the layer 1 in place of the dispersion liquid obtained in Synthesis Example 9 used in Example 7.

The obtained multilayer conductive film was subjected to measurements of the electric resistance per unit area in the thickness direction, the negative electrode potential durability, the positive electrode potential durability, and the barrier properties for a component contained in an electrolytic solution. For the measurements of the negative electrode potential durability and the barrier properties for a component contained in an electrolytic solution, the work electrode was installed so that the separator was in contact with the layer 1. In the positive electrode potential durability test, the work electrode was installed so that the separator was in contact with the layer 2 and b/a was calculated.

Example 11

A multilayer conductive film was obtained in a similar manner to that in Example 9 except that the dispersion liquid obtained in Synthesis Example 3 was used to form the layer 1 in place of the dispersion liquid obtained in Synthesis Example 9 used in Example 9.

The obtained multilayer conductive film was subjected to measurements of the electric resistance per unit area in the thickness direction, the negative electrode potential durability, the positive electrode potential durability, and the barrier properties for a component contained in an electrolytic solution. For the measurements of the negative electrode potential durability and the barrier properties for a component contained in an electrolytic solution, the work electrode was installed so that the separator was in contact with the layer 1. In the positive electrode potential durability test, the work electrode was installed so that the separator was in contact with the layer 2 and b/a was calculated.

Synthesis Example 14

Into a zirconia container, 58 g of polyisobutylene (trade name: EP400, manufactured by Kaneka Corporation), 64 g of nickel powder (Ni-255, an average particle size of 2.2 μm, manufactured by Fukuda Metal Foil & Powder Co., Ltd.), 192 g of toluene, and 500 g of zirconia balls having a diameter of 5 mm were charged and the mixture was subjected to ball mill dispersion to thus yield a dispersion liquid. The dispersion condition was at a rotation speed of 500 rpm for 45 minutes. To the dispersion liquid, 5.95 g of hardener, 0.11 g of retarder (trade name: Surfynol 61, manufactured by Nissin Chemical Industry Co., Ltd.), and 0.077 g of curing catalyst (trade name: Pt-VTS-3.0X, manufactured by Umicore Japan) were added and the mixture was stirred and degassed to yield a dispersion liquid.

The hardener used herein is a compound in which the average number of hydrosilyl groups is about 5.5 per molecule and that is obtained by adding 2 equivalents of α-olefin based on the total hydrosilyl group amount to methylhydrogen silicone having 7.5 (—Si—O—) repeating units on the average number in the presence of a platinum catalyst. The compound had a Si—H group content of 6 mmol/g.

Comparative Example 5

The dispersion liquid obtained in Synthesis Example 14 was cast with Comma Coater on an aluminum foil (a thickness of 30 μm, hereinafter called "layer 2") so as to give a final thickness of 48 μm. The film was heated and dried at 150° C. for 10 minutes to thus form a layer 1 on the layer 2, thereby yielding a multilayer conductive film.

The obtained multilayer conductive film was subjected to measurements of the electric resistance per unit area in the thickness direction, the negative electrode potential durability, the positive electrode potential durability, and the barrier properties for a component contained in an electrolytic solution. For the measurements of the negative electrode potential durability and the barrier properties for a component contained in an electrolytic solution, the work electrode was installed so that the separator was in contact with the layer 1. In the positive electrode potential durability test, the work electrode was installed so that the separator was in contact with the layer 2 and b/a was calculated.

Table 2 shows the results of Examples 7 toll, Reference Examples 1 and 2, and Comparative Example 5.

TABLE 2

|  | Reference Example | | Example | | | | | Comparative Example |
|---|---|---|---|---|---|---|---|---|
|  | 1 | 2 | 7 | 8 | 9 | 10 | 11 | 5 |
| Electric resistance per unit area (mΩ · cm$^2$) | 50 | 20 | 900 | 1000 | 9000 | 60 | 35 | 1000 |
| Lithium element penetration depth (μm) | 1 or less | 1 or less | 1 or less | 1 or less | 1 or less | 9 | 9 | 18 |
| Solvent barrier properties (mg) | 1.3 | 1.3 | — | — | — | — | — | — |
| Negative electrode potential durability | 2 | 2 | 3 | 2 | 2 | 3 | 3 | 18 |
| Positive electrode potential durability (b/a) | — | — | 0.02 | 0.02 | 0.03 | 0.02 | 0.03 | 0.03 |

Synthesis Example 15

N,N-dimethylformamide (DMF) was used as an organic solvent for polymerization and 50% by mol of 3,3',4,4'-biphenyltetracarboxylic dianhydride (hereinafter called BPDA), 50% by mol of 3,3',4,4'-benzophenonetetracarboxylic dianhydride (hereinafter called BTDA), 85% by mol of 4,4'-oxydianiline (hereinafter called ODA), and 15% by mol of p-phenylenediamine (hereinafter called p-PDA) were charged in a reaction vessel. The mixture of the materials in the ratios was stirred and polymerized, thereby synthesizing a polyamic acid solution. The synthesis was carried out so that the polyamic acid solution obtained here had a solid content concentration of 15% by weight and a viscosity of 300 to 400 Pa•s.

With a ball mill, 10 parts by weight of the polyamic acid solution, 1 part by weight of Ketjenblack (ECP600JD, manufactured by Lion Corporation), and 20 parts by weight of DMF were dispersed to thus yield a carbon dispersion liquid. The dispersion was carried out with zirconia balls having a diameter of 5 mm at a rotation speed of 600 rpm for a treatment time of 30 minutes.

Then, 100 parts by weight of the carbon dispersion liquid and 183 parts by weight of the polyamic acid solution were mixed to yield a homogeneous carbon-dispersed polyamic acid solution. The solution contained 10 parts by weight of Ketjenblack with respect to 100 parts by weight of polyamic acid.

To 100 g of the obtained carbon-dispersed polyamic acid solution, an imidization accelerator containing 7.5 g of isoquinoline, 7.5 g of acetic anhydride, and 5 g of DMF was added to make a homogeneous liquid. The liquid was cast on an aluminum foil so as to give a final thickness of 12.5 μm and a width of 50 cm and the film was dried at 120° C. for 108 seconds. The self-supporting film after drying was released from the aluminum foil and then was fixed to pins. The film was dried at 300° C. for 100 seconds and subsequently dried at 400° C. for 32 seconds, thereby yielding a single layer film as the layer 2.

Synthesis Example 16

In a mixed solvent containing 8 g of pure water, 72 g of isopropyl alcohol, and 2.7 g of acetic acid, 40.0 g of plate-like talc (trade name: SG-95, manufactured by Nippon Talc Co., Ltd.) was dispersed, then 1.6 g of silane coupling agent (trade name: SILQUEST A-137, manufactured by Momentive Japan) was added dropwise, and the mixture was well stirred. The dispersion liquid was filtered while being washed with pure water and the residue was dried at 100° C. for 3 hours to thus yield a surface-treated plate-like talc.

Synthesis Example 17

A surface-treated plate-like talc was obtained in a similar manner to that in Synthesis Example 16 except that the silane coupling agent (trade name: SILQUEST A-137, manufactured by Momentive Japan) used in Synthesis Example 16 was replaced with a silane coupling agent (trade name: SILQUEST A-171, manufactured by Momentive Japan).

Synthesis Example 18

Into a zirconia container, 44 g of cycloolefin polymer (trade name: ZEONOR 1410R, manufactured by ZEON Corporation), 4.4 g of Ketjenblack (trade name: ECP600JD, manufactured by Lion Corporation), 26.4 g of plate-like talc (trade name: SG-95, manufactured by Nippon Talc Co., Ltd.), 176 g of ethylcyclohexane, and 450 g of zirconia balls having a diameter of 5 mm were charged and the mixture was subjected to ball mill dispersion to thus yield a dispersion liquid. The dispersion condition was at a rotation speed of 500 rpm for 45 minutes.

Synthesis Example 19

A dispersion liquid was obtained in a similar manner to that in Synthesis Example 18 except that the amount of Ketjenblack (trade name: ECP600JD, manufactured by Lion Corporation) used in Synthesis Example 18 was changed to 6.6 g.

Synthesis Example 20

A dispersion liquid was obtained in a similar manner to that in Synthesis Example 18 except that the cycloolefin polymer (trade name: ZEONOR 1410R, manufactured by ZEON Corporation) used in Synthesis Example 18 was replaced with cycloolefin polymer (trade name: ZEONOR 1020R, manufactured by ZEON Corporation).

Synthesis Example 21

A dispersion liquid was obtained in a similar manner to that in Synthesis Example 20 except that the amount of Ketjenblack (trade name: ECP600JD, manufactured by Lion Corporation) used in Synthesis Example 20 was changed to 6.6 g.

Synthesis Example 22

A dispersion liquid was obtained in a similar manner to that in Synthesis Example 18 except that the amount of plate-like talc (trade name: SG-95, manufactured by Nippon Talc Co., Ltd.) used in Synthesis Example 18 was changed to 17.6 g.

Synthesis Example 23

A dispersion liquid was obtained in a similar manner to that in Synthesis Example 18 except that the plate-like talc (trade name: SG-95, manufactured by Nippon Talc Co., Ltd.) used in Synthesis Example 18 was replaced with the surface-treated plate-like talc obtained in Synthesis Example 16.

Synthesis Example 24

A dispersion liquid was obtained in a similar manner to that in Synthesis Example 18 except that the plate-like talc (trade name: SG-95, manufactured by Nippon Talc Co., Ltd.) used in Synthesis Example 18 was replaced with the surface-treated plate-like talc obtained in Synthesis Example 17.

Synthesis Example 25

A dispersion liquid was obtained in a similar manner to that in Synthesis Example 18 except that the plate-like talc used in Synthesis Example 18 was replaced with mica (trade name: A-11, manufactured by Yamaguchi Mica Co., Ltd.)

Synthesis Example 26

A dispersion liquid was obtained in a similar manner to that in Synthesis Example 18 except that the plate-like talc used in Synthesis Example 18 was not added.

Synthesis Example 27

A dispersion liquid was obtained in a similar manner to that in Synthesis Example 18 except that the plate-like talc used in Synthesis Example 18 was replaced with 35.2 g of silica particles (trade name: AEROSIL R972, manufactured by Nippon Aerosil Co., Ltd.)

Synthesis Example 28

A dispersion liquid was obtained in a similar manner to that in Synthesis Example 18 except that the plate-like talc used in Synthesis Example 18 was replaced with calcium silicate (trade name: #FPW5000, manufactured by Kinsei Matec Co., Ltd.) as an acicular filler.

Synthesis Example 29

The dispersion liquid obtained in Synthesis Example 18 was applied onto one face of an aluminum foil so as to give a final, thickness of 9 μm and the coating was dried at 80° C. for 4 minutes. The coating liquid was further applied onto the coated face so as to give a total final film thickness after drying of 18 μm and the coating was dried at 80° C. for 4 minutes. The self-supporting film after drying was released from the aluminum foil and fixed to a pin frame. The film was dried at 120° C. for 4 minutes, then at 180° C. for 4 minutes, and at 230° C. for 4 minutes, thus yielding a single layer film.

Example 12

One side of the single layer film as the layer 2 obtained in Synthesis Example 15 was subjected to corona treatment. Next, the dispersion liquid obtained in Synthesis Example 18 was applied onto the corona-treated face so as to give a film thickness after drying of 9 μm. The film was dried at 80° C. for 4 minutes, next at 120° C. for 4 minutes, then at 180° C. for 4 minutes, and at 230° C. for 4 minutes. The same dispersion liquid was applied onto the coated face of the film so as to give a final coating film thickness of 18 μm. The film was dried at 80° C. for 4 minutes, next at 120° C. for 4 minutes, then at 180° C. for 4 minutes, and at 230° C. for 4 minutes, thereby yielding a multilayer conductive film.

The obtained multilayer conductive film was subjected to measurements of the electric resistance per unit area in the thickness direction, the negative electrode potential durability, the positive electrode potential durability, the cycle relative irreversible capacity of a half cell, the warpage degree of the multilayered film, and the interlayer adhesion of the multilayered film. For the negative electrode potential durability, the work electrode was installed so that the separator was in contact with the layer 1 and the time until the film reached negative electrode potential as compared with copper foil was determined. In the positive electrode potential durability test, the work electrode was installed so that the separator was in contact with the layer 2 and b/a was calculated.

The solvent barrier properties of the layer 1 were determined by using the single layer film obtained in Synthesis Example 29.

Example 13

A multilayer conductive film was obtained in a similar manner to that in Example 12 except that the dispersion liquid of Synthesis Example 18 used in Example 12 was replaced with the dispersion liquid of Synthesis Example 19, and various physical properties of the film were evaluated.

The solvent barrier properties of the layer 1 was determined by using a single layer film obtained by a similar procedure to that in Synthesis Example 29 except that the dispersion liquid of Synthesis Example 19 was used in place of the dispersion liquid of Synthesis Example 18 used in Synthesis Example 29.

Example 14

A multilayer conductive film was obtained in a similar manner to that in Example 12 except that the film as the layer 2 used in Example 12 was changed from the single layer film of Synthesis Example 15 to the single layer film of Synthesis Example 2, and various physical properties of the film were evaluated.

The solvent barrier properties of the layer 1 were determined by using the single layer film obtained in Synthesis Example 29.

Example 15

A multilayer conductive film was obtained in a similar manner to that in Example 13 except that the single layer film of Synthesis Example 15 used in Example 13 was replaced with the single layer film of Synthesis Example 2, and various physical properties of the film were evaluated.

The solvent barrier properties of the layer 1 were the same as the solvent barrier properties of the layer 1 in Example 13.

Example 16

A multilayer conductive film was obtained in a similar manner to that in Example 12 except that the dispersion liquid of Synthesis Example 18 used in Example 12 was replaced with the dispersion liquid of Synthesis Example 20, and various physical properties of the film were evaluated.

The solvent barrier properties of the layer 1 was determined by using a single layer film obtained by a similar procedure to that in Synthesis Example 29 except that the dispersion liquid of Synthesis Example 20 was used in place of the dispersion liquid of Synthesis Example 18 used in Synthesis Example 29

Example 17

A multilayer conductive film was obtained in a similar manner to that in Example 12 except that the dispersion liquid of Synthesis Example 18 used in Example 12 was replaced with the dispersion liquid of Synthesis Example 21, and various physical properties of the film were evaluated.

The solvent barrier properties of the layer 1 was determined by using a single layer film obtained by a similar procedure to that in Synthesis Example 29 except that the dispersion liquid of Synthesis Example 21 was used in place of the dispersion liquid of Synthesis Example 18 used in Synthesis Example 29.

Example 18

A multilayer conductive film was obtained in a similar manner to that in Example 12 except that the dispersion liquid of Synthesis Example 18 used in Example 12 was replaced with the dispersion liquid of Synthesis Example 22, and various physical properties of the film were evaluated.

The solvent barrier properties of the layer 1 was determined by using a single layer film obtained by a similar procedure to that in Synthesis Example 29 except that the dispersion liquid of Synthesis Example 22 was used in place of the dispersion liquid of Synthesis Example 1.8 used in Synthesis Example 29.

Example 19

A multilayer conductive film was obtained in a similar manner to that in Example 12 except that the dispersion liquid of Synthesis Example 18 used in Example 12 was replaced with the dispersion liquid of Synthesis Example 23, and various physical properties of the film were evaluated.

The solvent barrier properties of the layer 1 was determined by using a single layer film obtained by a similar procedure to that in Synthesis Example 29 except that the dispersion liquid of Synthesis Example 23 was used in place of the dispersion liquid of Synthesis Example 18 used in Synthesis Example 29.

Example 20

A multilayer conductive film was obtained in a similar manner to that in Example 12 except that the dispersion liquid of Synthesis Example 18 used in Example 12 was replaced with the dispersion liquid of Synthesis Example 24, and various physical properties of the film were evaluated.

The solvent barrier properties of the layer 1 was determined by using a single layer film obtained by a similar procedure to that in Synthesis Example 29 except that the dispersion liquid of Synthesis Example 24 was used in place of the dispersion liquid of Synthesis Example 18 used in Synthesis Example 29.

Example 21

A multilayer conductive film was obtained in a similar manner to that in Example 12 except that the dispersion liquid of Synthesis Example 18 used in Example 12 was replaced with the dispersion liquid of Synthesis Example 25, and various physical properties of the film were evaluated.

The solvent barrier properties of the layer 1 was determined by using a single layer film obtained by a similar procedure to that in Synthesis Example 29 except that the dispersion liquid of Synthesis Example 25 was used in place of the dispersion liquid of Synthesis Example 18 used in Synthesis Example 29.

Example 22

A multilayer conductive film was obtained in a similar manner to that in Example 12 except that the dispersion liquid of Synthesis Example 18 used in Example 12 was replaced with the dispersion liquid of Synthesis Example 26.

The solvent barrier properties of the layer 1 was determined by using a single layer film obtained by a similar procedure to that in Synthesis Example 29 except that the dispersion liquid of Synthesis Example 26 was used in place of the dispersion liquid of Synthesis Example 18 used in Synthesis Example 29.

Example 23

A multilayer conductive film was obtained in a similar manner to that in Example 12 except that the dispersion liquid of Synthesis Example 18 used in Example 12 was replaced with the dispersion liquid of Synthesis Example 27, and various physical properties of the film were evaluated.

The solvent barrier properties of the layer 1 was determined by using a single layer film obtained by a similar procedure to that in Synthesis Example 29 except that the dispersion liquid of Synthesis Example 27 was used in place of the dispersion liquid of Synthesis Example 18 used in Synthesis Example 29.

Example 24

A multilayer conductive film was obtained in a similar manner to that in Example 12 except that the dispersion liquid of Synthesis Example 18 used in Example 12 was replaced with the dispersion liquid of Synthesis Example 28.

The solvent barrier properties of the layer 1 was determined by using a single layer film obtained by a similar procedure to that in Synthesis Example 29 except that the dispersion liquid of Synthesis Example 28 was used in place of the dispersion liquid of Synthesis Example 18 used in Synthesis Example 29.

Table 3 shows the results of Examples 12 to 24.

TABLE 3

| | Example | | | | | | | | | | | | |
|---|---|---|---|---|---|---|---|---|---|---|---|---|---|
| | 12 | 13 | 14 | 15 | 16 | 17 | 18 | 19 | 20 | 21 | 22 | 23 | 24 |
| Electric resistance per unit area (mΩ · cm$^2$) | 130 | 120 | 110 | 120 | 130 | 120 | 130 | 120 | 120 | 140 | 120 | 150 | 130 |
| Solvent barrier properties (mg) | 0.7 | 0.8 | 0.7 | 0.8 | 0.7 | 0.8 | 0.8 | 0.7 | 0.7 | 0.8 | 1.3 | 2 | 2.4 |
| Negative electrode potential durability | 3 | 5 | 3 | 3 | 3 | 5 | 3 | 8 | 3 | 4 | 3 | 3 | 4 |
| Positive electrode potential durability (b/a) | 0.03 | 0.03 | 0.03 | 0.03 | 0.03 | 0.03 | 0.03 | 0.03 | 0.03 | 0.03 | 0.03 | 0.03 | 0.03 |
| Relative irreversible capacity of half cell | 1.2 | 1.3 | 1.2 | 1.1 | 1.2 | 1.3 | 1.1 | 1.1 | 1.1 | 1.3 | 1.1 | 1.5 | 1.6 |
| Warpage degree of multilayer conductive film (mm) | 2 | 2 | 5 | 1 | 2 | 2 | 5 | 2 | 2 | 1 | x | x | x |
| Adhesion of multilayer conductive film (N/20 mm) | 1.5 | 1.3 | 1 | 1.2 | 1.5 | 1.3 | 1.3 | 1.5 | 1.6 | 0.9 | <0.1 | <0.1 | <0.1 |

As shown in Table 3, the multilayer conductive films of Examples 12 to 21 containing insulating plate-like inorganic particles had improved solvent barrier properties, excellent interlayer adhesion, and greatly improved warpage even in the multilayered film with a conductive polyimide film.

REFERENCE SIGNS LIST

1 Teflon (registered trademark) Block
2 O-ring
3 Film
4 Film Holder
5 Carbonate Solvent

The invention claimed is:

1. A multilayer conductive film to be used as a current collector comprising:
   a layer 1, and
   a layer 2 in contact with a positive electrode active material layer,
   the layer 1 including a conductive material containing a polymer material 1 having an alicyclic structure as the main polymer material and conductive particles 1; and
   the layer 2 including a material having durability against positive electrode potential, the material having durability against positive electrode potential being a conductive material containing a polymer material 2 having durability against positive electrode potential and conductive particles 2.

2. The multilayer conductive film according to claim 1, wherein the polymer material 1 having an alicyclic structure has a structural unit derived from cycloolefin on a main chain.

3. The multilayer conductive film according to claim 1, wherein the polymer material 1 having an alicyclic structure has an alicyclic structure with a condensed ring structure.

4. The multilayer conductive film according to claim 1, wherein the polymer material 1 having an alicyclic structure is at least one member selected from the group consisting of norbornene polymer and a hydrogenated product of the norbornene polymer.

5. The multilayer conductive film according to claim 1, wherein the polymer material 1 having an alicyclic structure is at least one selected from the group consisting of a ring-opened polymer of a norbornene monomer, a hydrogenated product of a ring-opened polymer of a norbornene monomer, an addition polymer of a norbornene monomer, and an addition copolymer of a norbornene monomer and a vinyl monomer.

6. The multilayer conductive film according to claim 1, wherein the conductive particles 1 are carbon conductive particles or conductive particles containing a metallic element.

7. The multilayer conductive film according to claim 1, wherein the conductive particles 1 are conductive particles containing a metallic element.

8. The multilayer conductive film according to claim 7, wherein the metallic element is at least one selected from the group consisting of platinum, gold, silver, copper, nickel, and titanium.

9. The multilayer conductive film according to claim 1, wherein the conductive material contains the conductive particles 1 and the polymer material 1 having an alicyclic structure in a weight ratio ranging from 1:99 to 99:1.

10. The multilayer conductive film according to claim 1, wherein the conductive material contains insulating plate-like inorganic particles.

11. The multilayer conductive film according to claim 10, wherein the insulating plate-like inorganic particles have a plate-like shape having an aspect ratio of 5 or more.

12. The multilayer conductive film according to claim 10, wherein the insulating plate-like inorganic particles are contained in an amount of 1 to 200 parts by weight with respect to 100 parts by weight of the polymer material 1 having an alicyclic structure.

13. The multilayer conductive film according to claim 1, wherein the polymer material 2 is at least one selected from the group consisting of aromatic polyimide, polyamide-imide, and polyamide.

14. The multilayer conductive film according to claim 1, wherein the conductive particles 2 are carbon conductive particles.

15. The multilayer conductive film according to claim 1, wherein the material having durability against positive electrode potential contains the polymer material 2 and the conductive particles 2 in a weight ratio ranging from 50:50 to 99:1.

16. The multilayer conductive film according to claim 1 having a thickness of 1 to 100 μm.

17. The multilayer conductive film according to claim 1 having an electric resistance per unit area in the thickness direction of 10 $\Omega \cdot cm^2$ or less.

18. A battery comprising the multilayer conductive film according to claim 1 as the current collector.

19. The battery according to claim 18 being a bipolar battery.

20. A bipolar battery comprising:
   the multilayer conductive film according to claim 1;
   a layer of a negative electrode active material, the layer being electrically connected to one face of the multilayer conductive film;
   a layer of a positive electrode active material, the layer being electrically connected to the other face of the multilayer conductive film; and
   electrolyte layers alternately stacked on electrodes for a bipolar battery, the electrode including the multilayer conductive film, the positive electrode active material layer, and the negative electrode active material layer,
   the positive electrode active material layer being in contact with the layer 2 of the multilayer conductive film.

21. The bipolar battery according to claim 20, wherein the positive electrode active material contains at least one member selected from the group consisting of a composite oxide of lithium and a transition metal and the negative electrode active material contains a composite oxide of lithium and a transition metal, carbon, and mixtures thereof.

* * * * *